US006643472B1

(12) United States Patent
Sakamoto et al.

(10) Patent No.: US 6,643,472 B1
(45) Date of Patent: Nov. 4, 2003

(54) APD BIAS CIRCUIT

(75) Inventors: Hisaya Sakamoto, Kawasaki (JP);
Tetsuya Kiyonaga, Kawasaki (JP);
Takashi Kurooka, Kawasaki (JP);
Akimitsu Miyazaki, Kawasaki (JP);
Nobuaki Sato, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/506,702

(22) Filed: Feb. 18, 2000

(65) Prior Publication Data (65)

(30) Foreign Application Priority Data

Feb. 19, 1999 (JP) .......................................... 11-041782

(51) Int. Cl.[7] .......................... H04B 10/00; H04B 10/06
(52) U.S. Cl. .................................... 398/202; 250/214 R
(58) Field of Search ....................... 398/202, 203–214; 250/200, 214 R, 214.1, 216

(56) References Cited

U.S. PATENT DOCUMENTS

| | | | | |
|---|---|---|---|---|
| 5,166,819 A | * | 11/1992 | Eichel | 398/202 |
| 5,194,979 A | * | 3/1993 | Koai et al. | 398/202 |
| 5,212,378 A | * | 5/1993 | Uda | 250/214 R |
| 5,254,851 A | * | 10/1993 | Yamakawa et al. | 250/214 A |
| 5,477,370 A | * | 12/1995 | Little et al. | 398/202 |
| 5,532,474 A | * | 7/1996 | Dautet et al. | 250/214 R |
| 5,625,181 A | * | 4/1997 | Yasuda et al. | 250/214 A |
| 5,953,109 A | * | 9/1999 | Lai et al. | 356/5.01 |
| 6,031,219 A | * | 2/2000 | Shuke | 250/214 R |
| 6,052,190 A | * | 4/2000 | Sekowski et al. | 356/601 |

* cited by examiner

Primary Examiner—Jason Chan
Assistant Examiner—Agustin Bello
(74) Attorney, Agent, or Firm—Staas & Halsey LLP

(57) ABSTRACT

An APD bias circuit includes an APD, an equalizer amplifier receiving an output signal of the APD, and first, second and third resistors connected in series to the APD to which a bias voltage is applied therethrough. A bias control circuit is connected to a first node between the first and second resistors, and receives a current from the first node so that a voltage of the first node can be maintained at a constant level. A first capacitor is connected between a ground and a second node between the second and third resistors. A second capacitor is connected between the ground and a third node between the third resistor and the APD. A first time constant defined by the second resistor and the first capacitor is greater than a second time constant defined by the third resistor and the second capacitor.

24 Claims, 24 Drawing Sheets

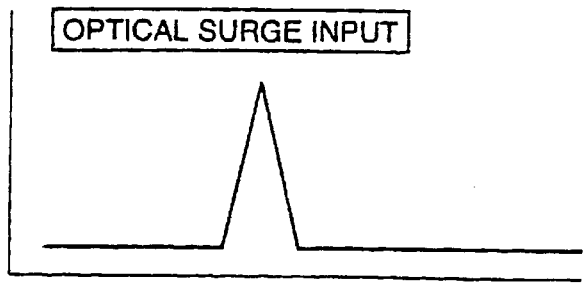
FIG. 25A
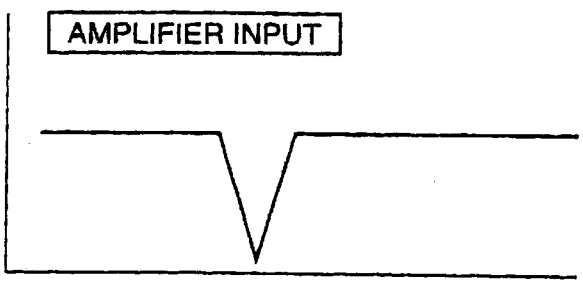
FIG. 25B
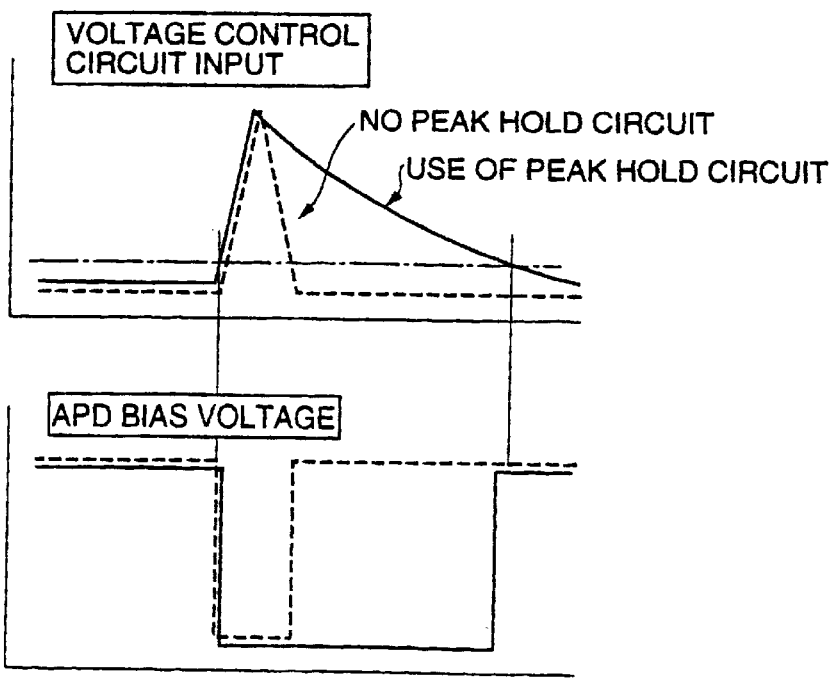
FIG. 25C
FIG. 25D

APD BIAS CIRCUIT

BACKGROUND OF THE INVENTION

1. Field of the Invention

The present invention relates to an APD (Avalanche PhotoDiode) bias circuit which stably operates an APD receiving a light signal.

As is known, the multiplication factor of the APD can be controlled by a bias current flowing therein. Thus, the bias voltage is controlled in accordance with the light input level, so that the received signal can be maintained at a given level.

2. Description of the Related Art

FIG. 1 shows an optical receiver 100, which includes an APD 101, a bias circuit 102, an equalizer amplifier 103, a timing extractor 104, and a decision making unit 105. An optical input OPTin from an optical transmission line or the like is applied to the APD 101. The bias circuit 102 controls the multiplication factor of the APD 101 in accordance with the level of the optical input OPTin.

The output signal of the APD 101 is equalized by the equalizer amplifier 103. A timing signal corresponding to the bit rate of data is extracted from the equalized signal by the timing extractor 104, and is output as a clock signal CLKout. The clock signal CLKout is also applied to the decision unit 105 as a decision timing signal. The decision unit 105 makes a level decision and outputs reproduced data DATAout.

FIG. 2 is a circuit diagram of a conventional APD bias circuit, which is related to the APD 101, the bias circuit 102, and the equalizer amplifier 103 shown in FIG. 1. A voltage $V_{DD}$ is applied to the APD 101 via resistors R1a and R2a connected in series. A current $I_{APD}$ flowing in the APD 101 and having a magnitude based on the level of the optical input is applied to the equalizer amplifier 103. A bias control circuit is connected to a node in which the resistors R1a and R2a are connected together. The above bias control circuit includes Vo control circuit 111, a Vo monitor circuit 112, an internal stabilized power source 113, an $M_{OPT}$ adjustment unit 114, a temperature sensor 115, and a temperature control circuit 116. Even if the current $I_{APD}$ fluctuates due to variations in temperature and the optical input, the Vo control circuit 111 controls a current $I_{CONT}$ to keep the voltage Vo of the node between the resistors R1a and R2a at a given constant level.

The power supply voltage $V_{DD}$ is equal to, for example, 85 V, and the bias setting voltage Vo is equal to, for example, 30 V. By controlling the current flowing in the resistor R1a, it is possible to maintain the bias setting voltage Vo at the constant level. That is, the following equations stand:

$$Vo = V_{DD} - Io \, Ra1$$

$$Io = I_{CONT} + I_{APD}$$

Thus, even if the optical input power changes and the current $I_{APD}$ is thus changed, the bias setting voltage Vo can be controlled at the constant level by controlling the current $I_{CONT}$ to maintain the current Io at a constant level.

The bias voltage $V_{APD}$ and the current $I_{APD}$ applied to the APD 101 are obtained as solutions of the following simultaneous equations:

$$I_{APD} = (e?\lambda/h\,c)\eta M \, Pin \qquad (1)$$

$$V_{APD} = (Vo - Vin) - R2a \, I_{APD} \qquad (2)$$

$$M = 1/[1 - (V_{APD}/V_B)^n] \qquad (3)$$

where e is the charge of electrons, $\lambda$ is the wavelength of the optical input, h is Planck's constant, c is the speed of light, $\eta$ is the quantum efficiency, M is the multiplication factor, Pin is the average optical input power, $V_{APD}$ is the bias voltage of the APD, Vo is the bias setting voltage, $I_{APD}$ is the optical current of the APD, $V_B$ is the breakdown voltage of the APD, and n is a value (fitting coefficient) determined by the physical properties of the APD.

As the optical input power Pin increases, the current $I_{APD}$ flowing in the APD 101 is increased, and the voltage drop developing across the resistor R2a is increased. Thus, the bias voltage $V_{APD}$ is decreased and the multiplication factor M is also decreased. In contrast, as the optical input power Pin decreases, the current $I_{APD}$ flowing in the APD 101 is decreased, and the voltage drop developing across the resistor R2a is reduced. Thus, the bias voltage $V_{APD}$ is increased and the multiplication factor M is also increased.

FIG. 3 is a graph of a multiplication factor vs. optical input level characteristic. In order to widen the dynamic range of the optical receiver, the multiplication factor M is set as high as, for example, about 10–20 at the minimum optical input level, and is set as low as, for example, about 1–3 at the maximum optical input level. The tolerable variation range of the optical input power Pin defines the dynamic range of the optical receiver.

In order to stabilize the APD bias circuit shown in FIG. 2 in a situation in which the optical input power varies, it is proposed, as shown in FIG. 4, to provide a capacitor C2a between the ground and a node connecting the resistor R2a and the APD 101 together. Let τ0, τ1 and τ2 be respectively the time constants of the bias control circuit 110, the bias setting voltage Vo, and the circuit made up of the resistor R2a and the capacitor C2a, the time constant τ1 being inversely proportional to the time constant τ2.

In this case, it is necessary to determine the time constants τ1 and τ2 so that the following conditions (a) and (b) are satisfied. The condition (a) requires that, when the optical input is broken or cut off from the maximum receive level, the bias voltage $V_{APD}$ does not exceed the breakdown voltage $V_B$. The condition (b) requires that, when the optical input rises to the maximum receive level from the input broken level, or when an optical surge is input, the APD current $I_{APD}$ does not exceed the maximum rated currents of the APD and the equalizer amplifier.

FIGS. 5A, 5B and 5C are graphs related to a case where the optical input is broken from the maximum receive level. More particularly, FIG. 5A shows a variation in the optical input power, FIG. 5B is a variation in the bias voltage, and FIG. 5C is a variation in the APD current. As shown in FIG. 5A, if the optical input power decreases to the optical input broken level from the maximum receive level for a short time of a few microseconds to hundreds of microsecond due to a failure in the optical transmission line or an abnormality at the transmission side, the current $I_{APD}$ flowing in the APD 101 decreases in accordance with the optical input power. Thus, as shown in FIG. 5B, the bias setting voltage Vo increases based on the time constant τ0. Generally, the time constant τ0 is a value which does not allow the bias control circuit 110 to follow the variation in the optical input power. Hence, the bias voltage $V_{APD}$ indicated by the broken line increases and may exceed the breakdown voltage $V_B$.

As shown in FIG. 5C, the APD current $I_{APD}$ decreases as the optical receive level decreases. However, a breakdown current flows due to a critical situation in which the bias voltage $V_{APD}$ increases and exceeds the breakdown voltage $V_B$.

FIGS. 6A, 6B and 6C are related to a case where the optical input increases to the maximum optical receive level from the input broken level. More particularly, FIG. 6A shows a variation in the optical input power, FIG. 6B shows a variation in the bias voltage, and FIG. 6C shows a variation in the APD current. As shown in FIG. 6A, if the optical input increases to the maximum receive level from the optical input broken level for a short time of a few microseconds to hundreds of microsecond, the bias setting voltage Vo is maintained at a given level as indicated by the solid line in FIG. 6B. Correspondingly, the bias voltage $V_{APD}$ remains at the previous level, or gradually decreases.

Thus, as shown in FIG. 6C, the APD current $I_{APD}$ increases over the absolute maximum rated current because the optical input power increases due to the multiplication factor M still being large. This causes degradation of the APD 101 and a failure of the equalizer amplifier 103.

The above-mentioned conventional circuit can stabilize the voltage Vo by means of the bias control circuit 110, and can control the multiplication factor M of the APD 101 to a desired level in accordance with the optical input level. However, as shown in FIGS. 5A–5B and 6A–6C, an abrupt variation in the optical input level causes the bias voltage to exceed the breakdown voltage $V_B$ to be applied to the APD 101, and causes the current $I_{APD}$ to exceed the maximum rated current to flow therein, so that the APD 101 is degraded.

With the above in mind, it is conceivable to improve the response speed of the bias control circuit 110 and makes it possible to follow variation in the APD current $I_{APD}$ at high speed, so that the voltage Vo can be controlled at the constant level. However, there is a limit to improvement of the response speed because the bias control circuit 110 includes operational amplifiers and stable control operation must be performed. Thus, it is difficult to stabilize the voltage Vo at the constant level when the optical input abruptly changes from the maximum receive level to the broken level or vice versa.

It is desirable to set the time constant τ2 defined by the resistor R2a and the capacitor C2a to a large value in order to suppress an increase of the bias voltage $V_{APD}$. However, to the contrary, it is desirable to set the time constant τ2 to a small value in order to suppress an increase of the APD current $I_{APD}$ flowing when the optical input changes from the input broken level to the maximum light receive level.

Thus, the conventional configuration cannot achieve the stable control in the case where the optical input changes from the maximum receive level to the input broken level and in the case where the optical input changes from the input broken level to the maximum receive level. In order to avoid the above-mentioned drawbacks, it is conceivable to form the bias control circuit 110 by high-speed transistors to increase the response speed. However, this is not economical and practical.

SUMMARY OF THE INVENTION

It is an object of the present invention to provide an APD bias circuit in which the above-mentioned disadvantages are eliminated.

A more specific object of the present invention is to provide an APD bias circuit which stably operates the APD even if an abrupt change in the optical input power occurs.

The above objects of the present invention are achieved by an APD bias circuit adapted to a circuit including an APD receiving an optical signal, and an equalizer amplifier receiving an output signal of the APD. The APD bias circuit includes: first, second and third resistors connected in series to the APD to which a bias voltage is applied therethrough; a bias control circuit connected to a first node between the first and second resistors, the bias control circuit receiving a current from the first node so that a voltage of the first node can be maintained at a constant level; a first capacitor connected between a ground and a second node between the second and third resistors; and a second capacitor connected between the ground and a third node between the third resistor and the APD, a first time constant defined by the second resistor and the first capacitor being greater than a second time constant defined by the third resistor and the second capacitor.

BRIEF DESCRIPTION OF THE DRAWINGS

Other objects, features and advantages of the present invention will become more apparent from the following detailed description when read in conjunction with the accompanying drawings, in which:

FIGS. 25A, 25B, 25C and 25D are diagrams of an operation of the eighth embodiment of the present invention.

DESCRIPTION OF THE PREFERRED EMBODIMENTS

Figure 7:
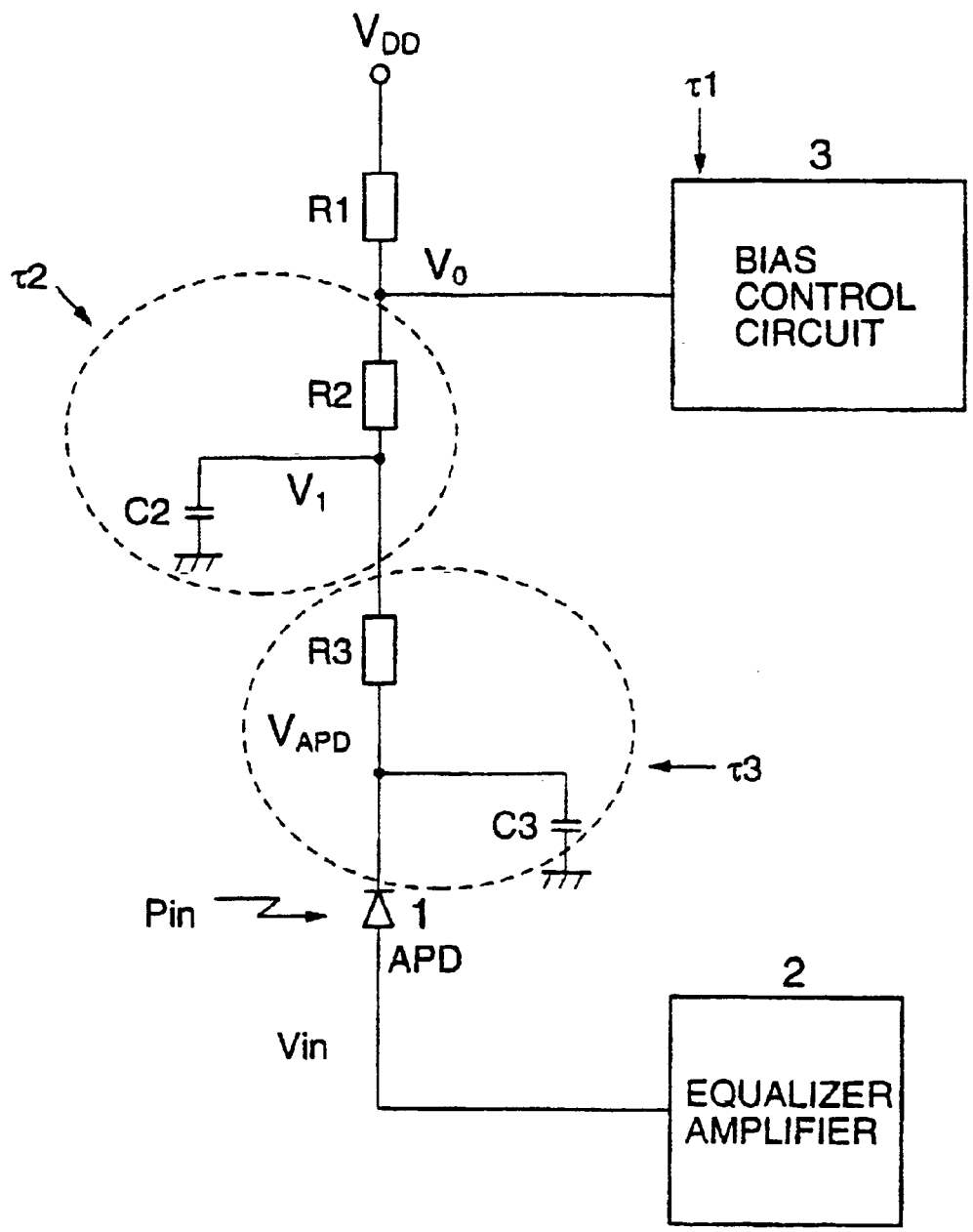
FIG. 7 is a block diagram of a first embodiment of the present invention.

FIG. 7 is a block diagram of a first embodiment of the present invention. The circuit shown in FIG. 7 includes an APD, an equalizer amplifier 2, a bias control circuit 3, first through third resistors R1, R2 and R3, and capacitors C1 and C2. The first through third resistors R1–R3 are connected in series to the APD 1, to which the power supply voltage $V_{DD}$ is applied via these resistors. A current responsive to the optical input power Pin inputs the equalizer amplifier 2.

Figure 1:
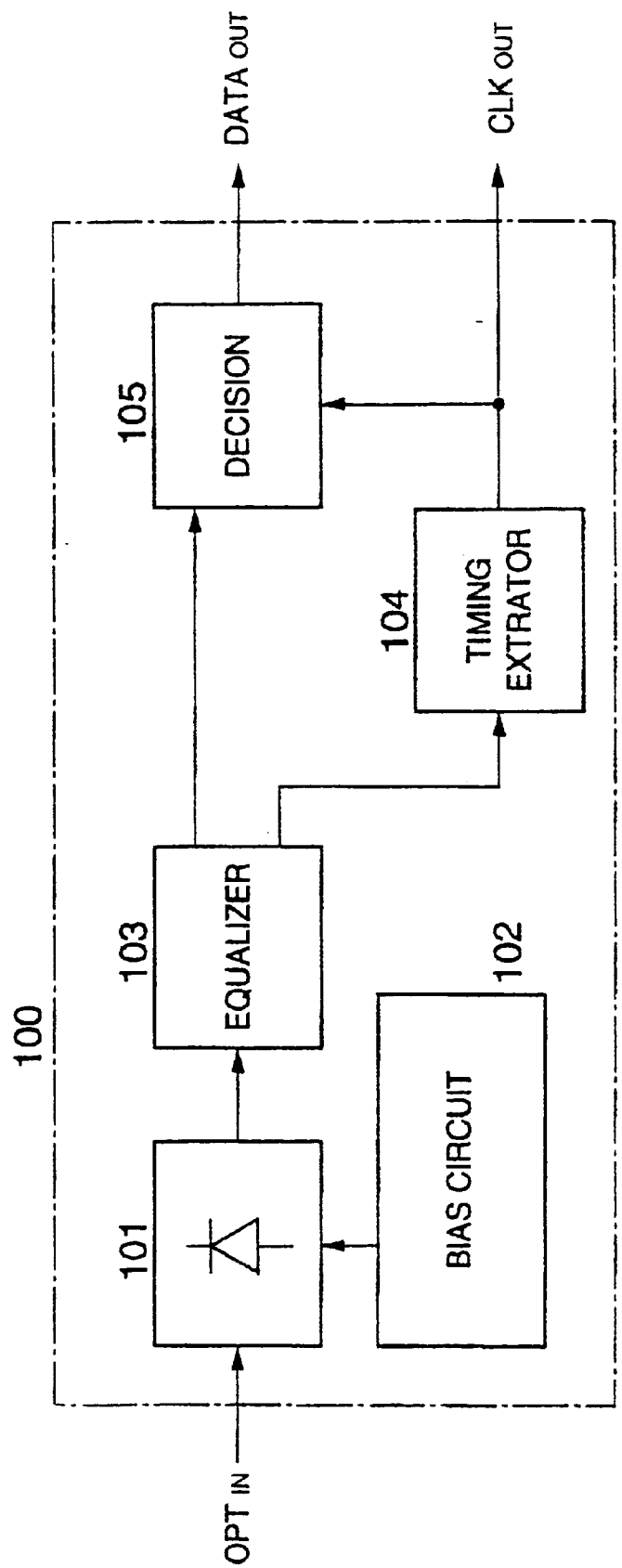
FIG. 1 is a block diagram of an optical receiver.
Figure 2:
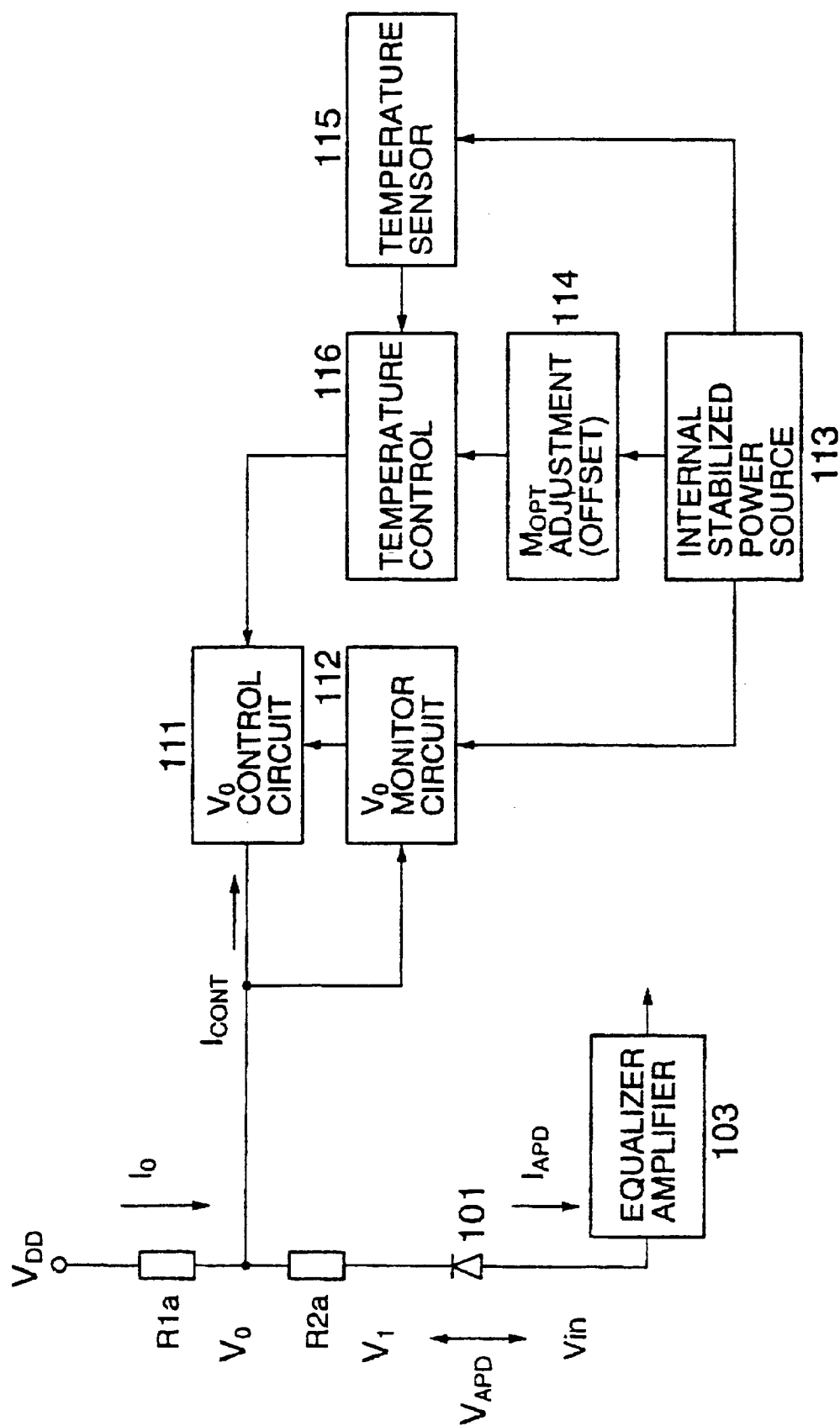
FIG. 2 is a block diagram of a conventional APD bias control circuit.
Figure 3:
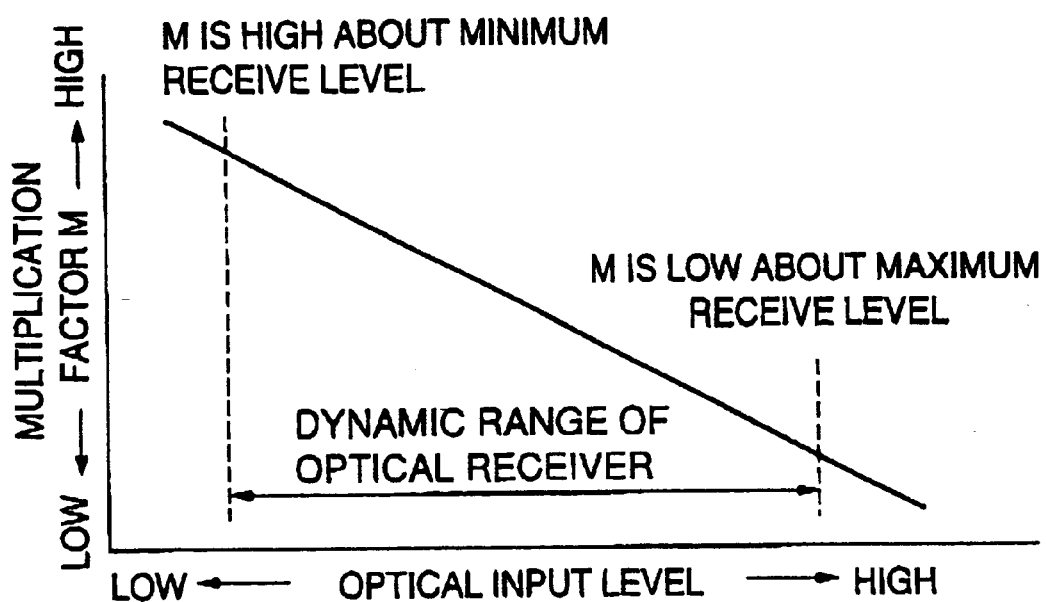
FIG. 3 is a graph of a multiplication factor vs. optical input level characteristic.
Figure 4:
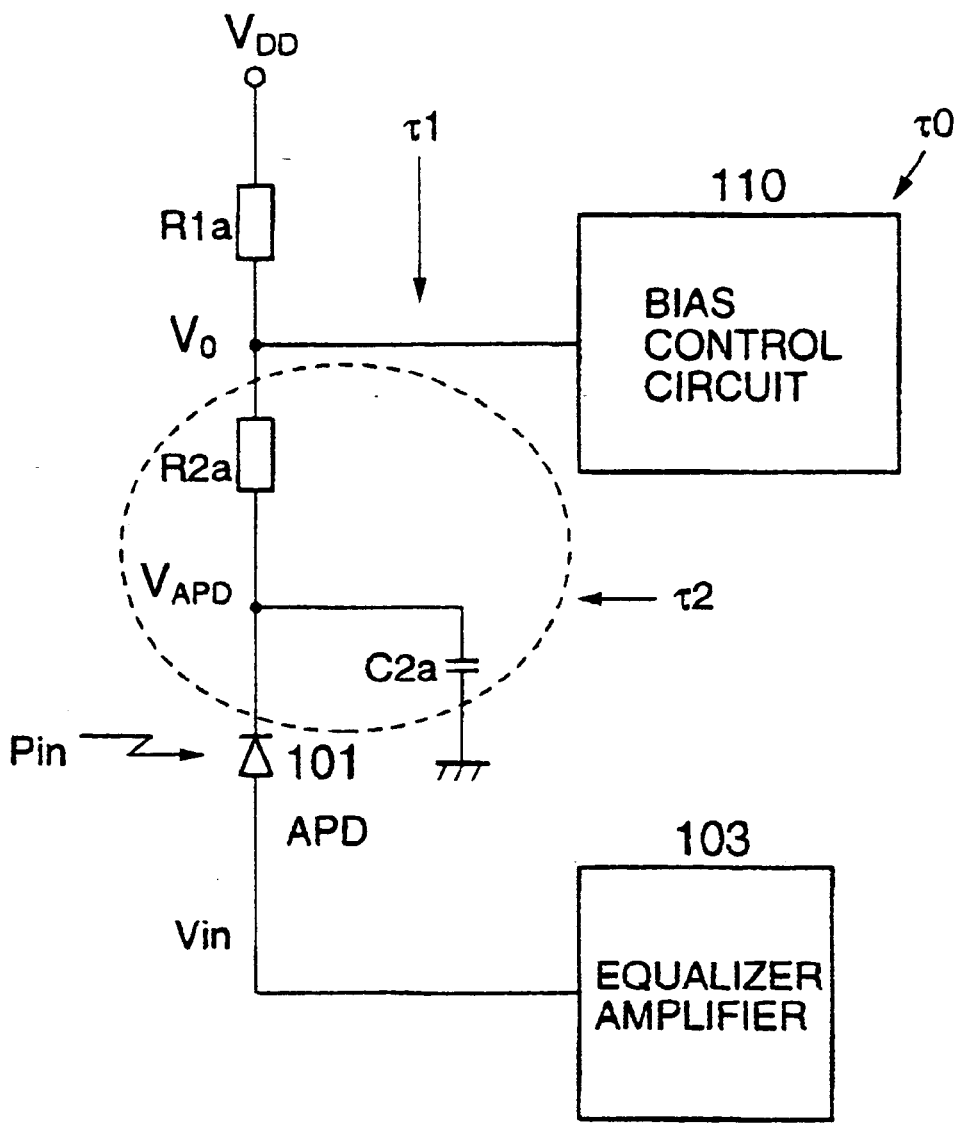
FIG. 4 is a block diagram showing time constants selected in the conventional circuit.
Figure 5A:
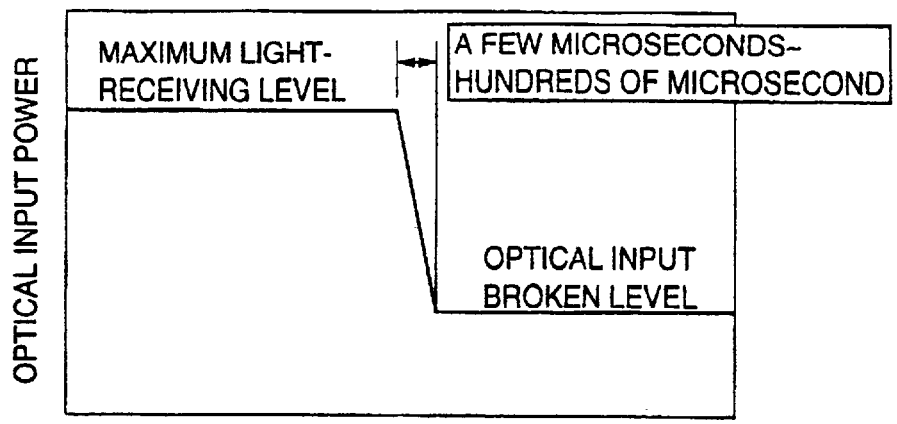
FIGS. 5A, 5B and 5C are diagrams of an operation of the conventional APD bias control circuit observed when the optical input changes from a maximum receive level to an input broken level.
Figure 5B:
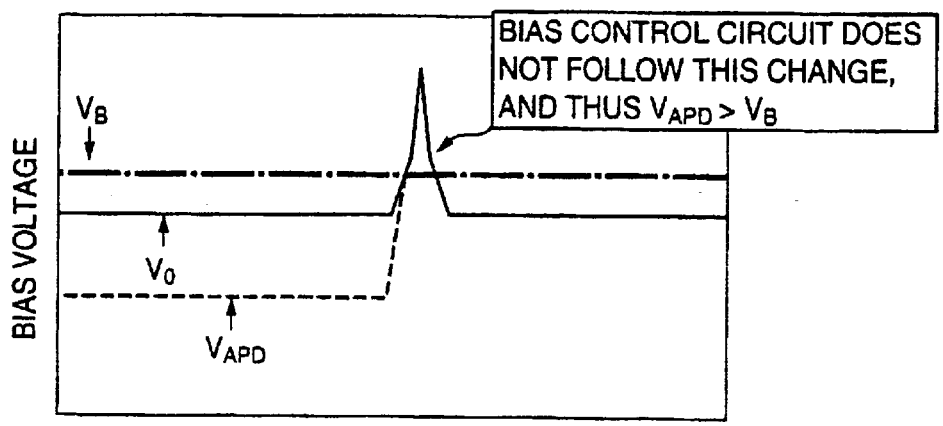
Figure 5C:
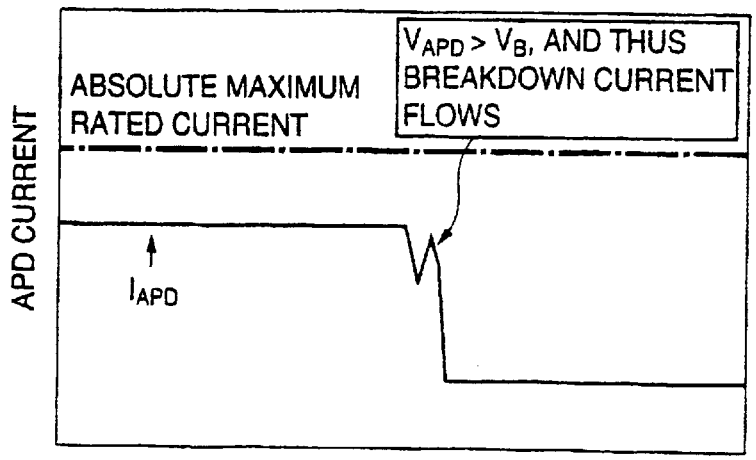
Figure 6A:
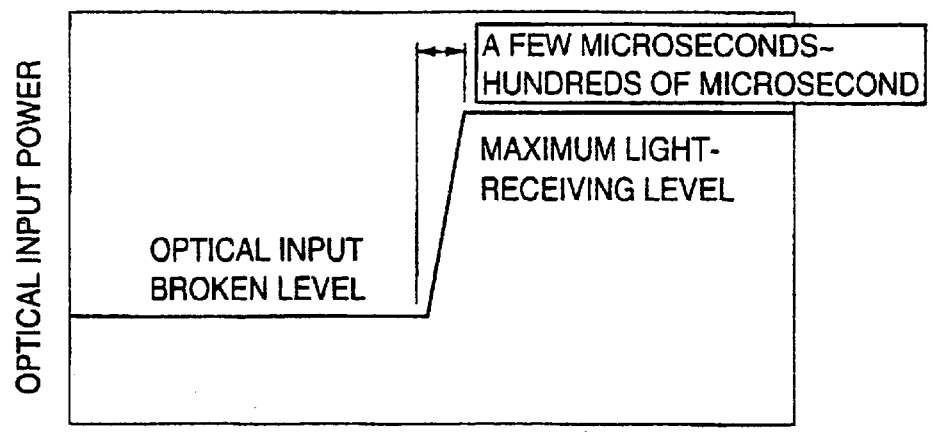
FIGS. 6A, 6B and 6C are diagrams of an operation of the conventional APD bias control circuit observed when the optical input changes from the input broken level to the maximum receive level.
Figure 6B:
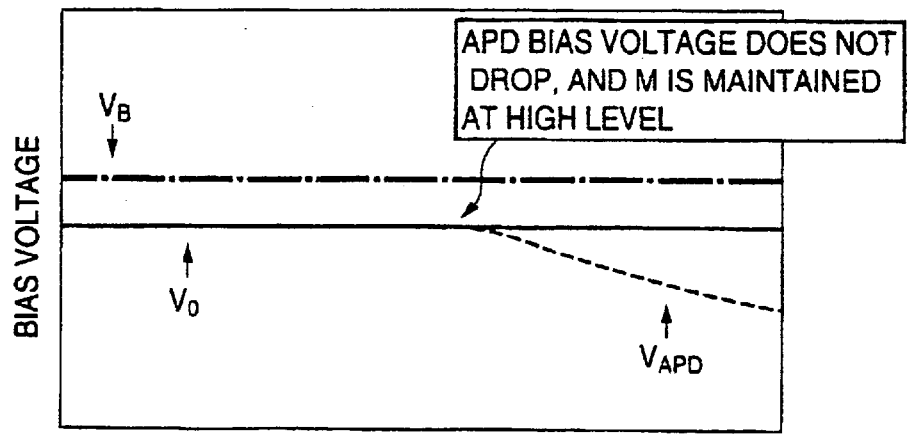
Figure 6C:
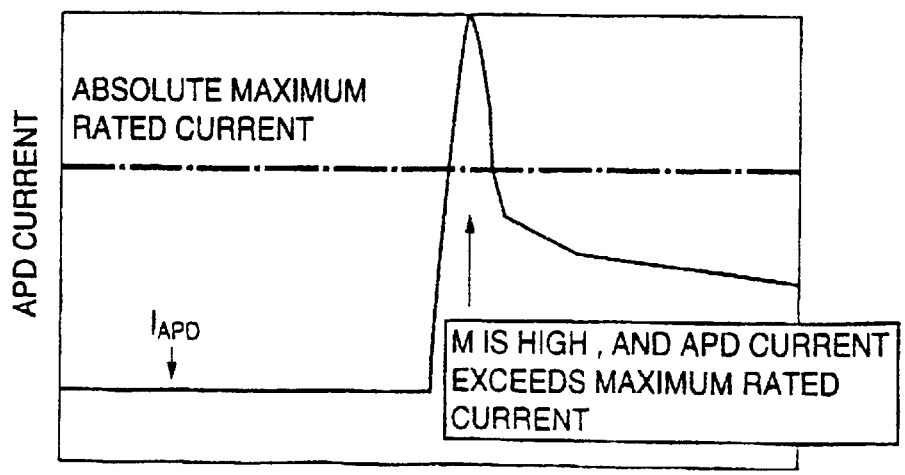

The bias control circuit 3 having the time constant $\tau 1$ is connected to a node in which the first resistor R1 and the second resistor R2 are connected. The bias control circuit 3 may be configured as shown in 2. That is, in order to maintain the bias setting voltage Vo of the node between the first resistor R1 and the second resistor R2, a current branch control is performed in order to regulate the current flowing in the first resistor R1 at the constant level. The output signal of the equalizer amplifier 2 is applied to, for example, the timing extractor 104 and the decision making unit 105 shown in FIG. 1.

The first capacitor C2 is connected between the ground and a node in which the second resistor R2 and the third resistor R3 are connected together. The third capacitor C3 is connected between the ground and a node in which the third resistor and the APD 1 are connected. The time constant $\tau 2$ defined by the second resistor R2 and the first capacitor C2 and the time constant $\tau 3$ defined by the third resistor R3 and the second capacitor C3 are designed so that $\tau 2 > \tau 3$.

For example, the time constant $\tau 3$ is set greater than a few microseconds, and the time constant $\tau 2$ is set smaller than hundreds of a microsecond. The time constant $\tau 1$ of the bias control circuit 3 is set as in the case of the conventional circuit. The optical input power Pin coming from an optical transmission line or the like is applied to the APD 1, and is converted into current. The bias control circuit 3 performs the current branching control to cause a constant current to flow in the first resistor R1, so that the bias setting voltage Vo is set to the constant level at a response speed based on the time constant $\tau 1$.

In the steady state, the bias setting voltage Vo is maintained at the constant level. When the optical input power Pin is small, the current flowing in the APD 1 is also small. Thus, the voltage drop caused by the resistors R2 and R3 is also small. Thus, the bias voltage $V_{APD}$ is high, and a large multiplication factor M can be obtained. Thus, the output signal is regulated at a given constant level. On the contrary, when the optical input power Pin is large, a large current flows in the APD 1. Thus, a large voltage drop is caused by the resistors R2 and R3. As a result, the bias voltage $V_{APD}$ is decreased, and a small multiplication factor M can be obtained. Thus, the output signal is regulated at the given constant level.

The total resistance value of the resistors R2 and R3 connected in series is set equal to that of the resistor R2a used in the conventional circuit. Strictly speaking, a time-constant circuit including the capacitors C2 and C3 is formed, and a fine adjustment based on the capacitance values thereof may be required. In order to set the APD current to less than the maximum rated current, the resistors R2 and R3 and the capacitors C2 and C3 are selected so as to satisfy the following:

$$R2+R3=(Vo-Vin)/I_{LIM} \quad (4)$$

$$C2=\tau 2/R2 \quad (5)$$

$$C2=\tau 1/R3 \quad (6)$$

where $I_{LIM}$ is a limit current. The time constants $\tau 2$ and $\tau 3$ are set so that $\tau 2 > \tau 3$, as described before.

Figure 8A:
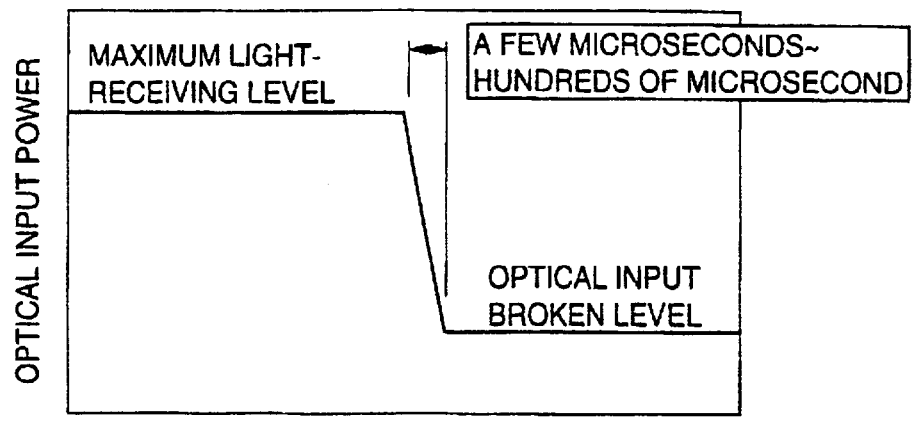
FIGS. 8A, 8B and 8C are diagrams of an operation of the circuit shown in FIG. 7 observed when the optical input power changes.
Figure 8B:
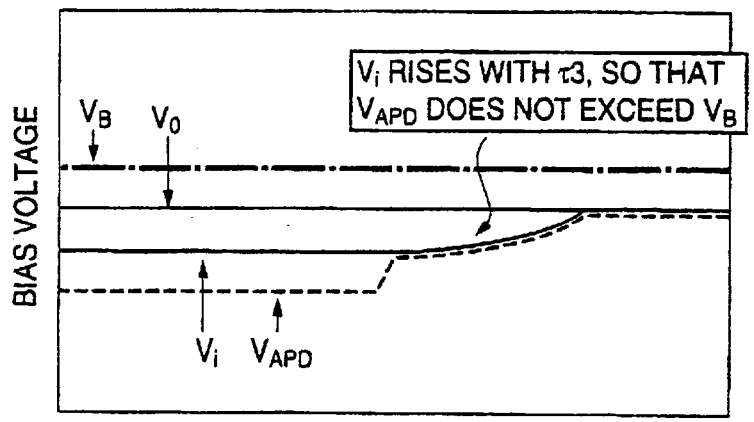
Figure 8C:
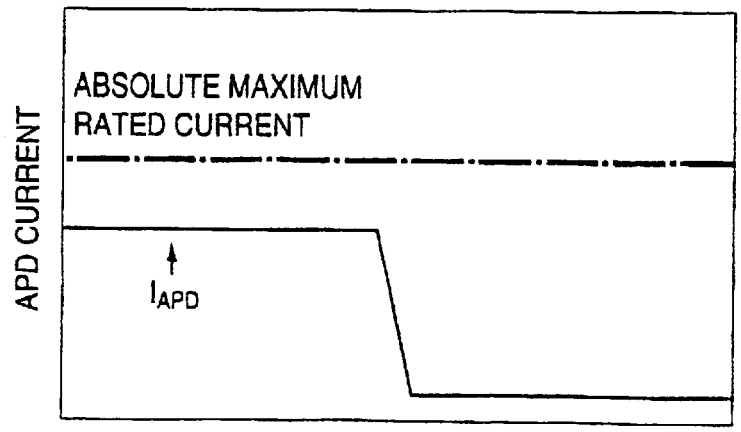

FIGS. 8A, 8B and 8C show operations of the first embodiment of the present invention observed when the optical input power changes from the maximum receive level to the input broken level. As shown in FIG. 8A, if the optical input changes from the maximum receive level to the input broken level for a time as short as a few microseconds to hundreds of microseconds, a voltage V1 of the node between the resistors R2 and R3 changes in accordance with the time constant $\tau 2$, as shown in FIG. 8B. Thus, the bias voltage $V_{APD}$ increases as the current decreases.

At that time, the bias setting voltage Vo controlled by the bias control circuit 3 cannot follow an abrupt change of the optical input power. The voltage V1 of the node between the resistors R2 and R3 increases in accordance with the time constant $\tau 2$. Thus, the bias voltage $V_{APD}$ also increases so as to follow increases of the voltage V1. Hence, the bias voltage $V_{APD}$ does not increase to the extent that it exceeds the breakdown voltage $V_B$. As shown in FIG. 8C, the APD current $I_{APD}$ decreases in response to the change of the optical input power from the maximum receive level to the input broken level.

Figure 9A:
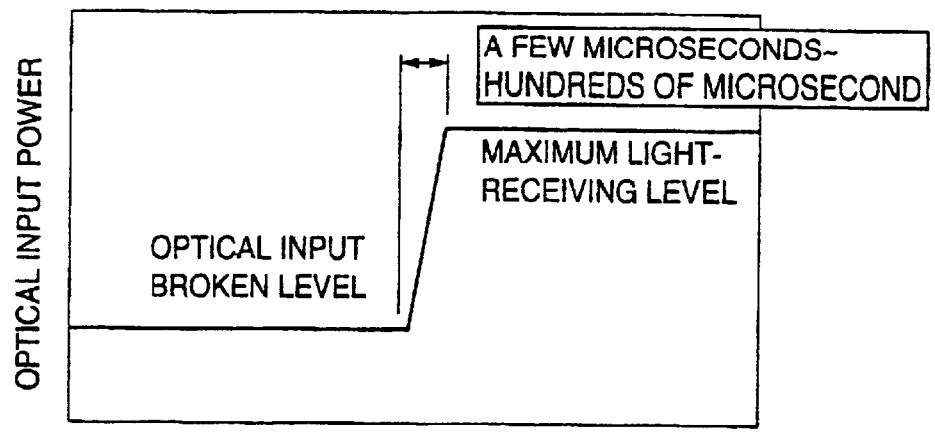
FIGS. 9A, 9B and 9C are diagrams of an operation of the circuit shown in FIG. 7 observed when the optical input power changes.
Figure 9B:
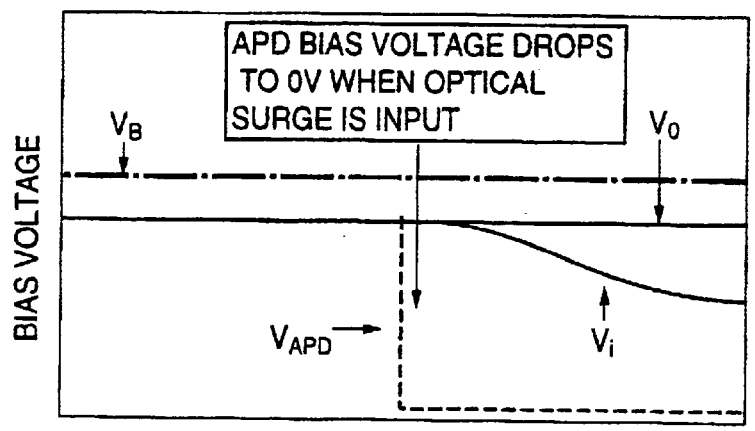
Figure 9C:
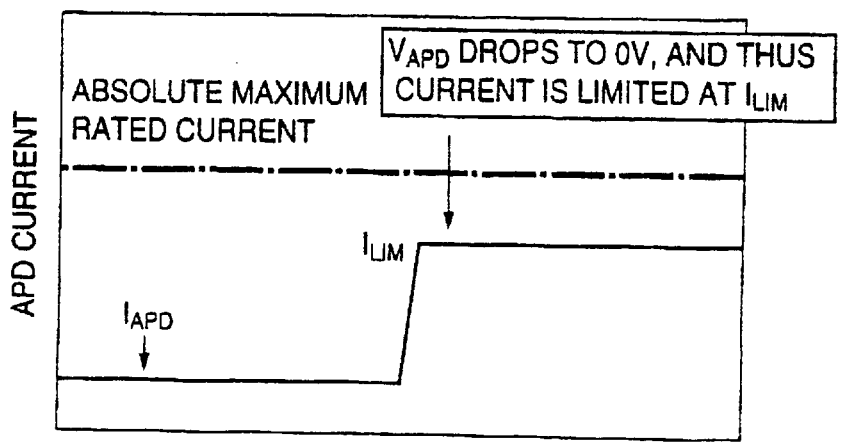

FIGS. 9A, 9B and 9C show operations of the first embodiment of the present invention observed when the optical input power changes from the input broken level to the maximum receive level. As shown in FIG. 8A, if the optical input changes from the input broken level to the maximum receive level for a time as short as a few microseconds to hundreds of microseconds, the bias control circuit cannot control the voltage Vo at the constant level in response to such an abrupt change of the optical input power. Thus, as shown in FIG. 9B, the voltage Vo substantially remains at the constant level. The voltage V1 of the node between the resistors R2 and R3 decreases in accordance with the time constant $\tau 2$ even when the current flowing in the APD 1 abruptly increases.

Thus, the bias voltage $V_{APD}$ is decreased to a level close to 0 V due to the voltage drop caused by the resistors R2 and R3. Thus, as shown in FIG. 9C, the APD current $I_{APD}$ can be controlled so that it does not exceed the limit current $I_{LIM}$. This results from the unique arrangement in which the time-constant circuits having the different time constants $\tau 2$ and $\tau 3$ are connected in series to the APD 1, and the time constant $\tau 3$ closer to the APD 1 is less than the time constant $\tau 2$ closer to the bias setting voltage Vo. With the above arrangement, it is possible to prevent the bias voltage $V_{APD}$ from exceeding the breakdown voltage $V_B$ and prevent the APD current $I_{APD}$ from exceeding the maximum rated current even if the optical input power changes abruptly.

Figure 10:
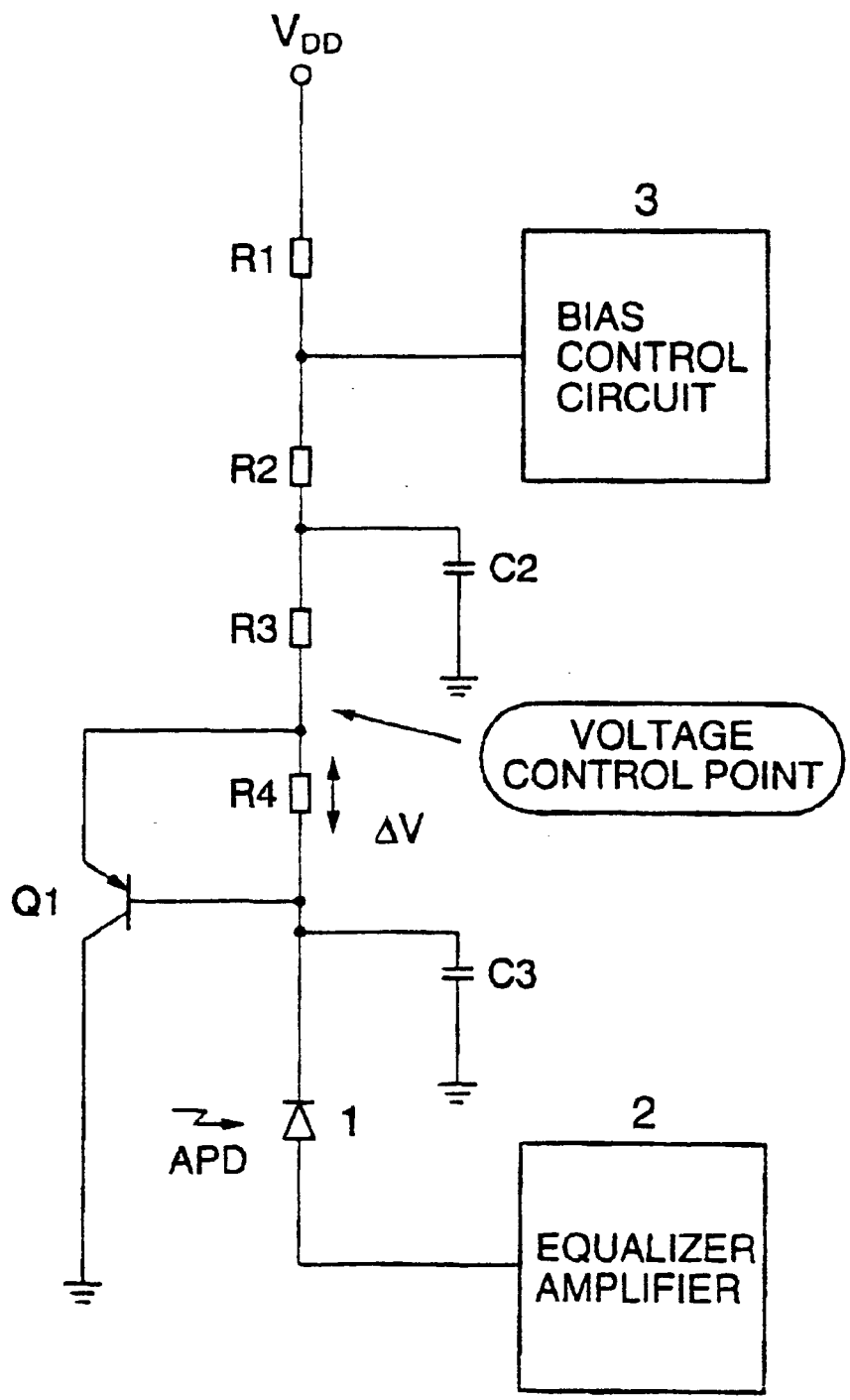
FIG. 10 is a block diagram of a second embodiment of the present invention.

FIG. 10 shows a second embodiment of the present invention, in which parts that are the same as those shown in FIG. 7 are given the same reference numbers. The circuit shown in FIG. 10 includes a pnp transistor Q1, and a resistor R4. The resistors R1, R2, R3 and R4 are connected in series to the APD 1, to which the power supply voltage $V_{DD}$ is applied via these series-connected resistors R1–R4. The total resistance value of the resistors R2, R3 and R4 connected in series is equal to or close to the resistance value of the resistor R2a used in the conventional circuit. The bias control circuit 3 is connected to the node between the resistors R1 and R2 connected in series. The capacitor C2 is connected between the ground and the node between the resistors R2 and R3 connected in series. The transistor Q1 forms a current limiting circuit which limits the current flowing in the APD 1.

The resistor R4 is connected between the emitter and base of the transistor Q1, and the collector thereof is grounded. The capacitor C3 is connected between the base of the transistor Q1 and the ground. Thus, a time-constant circuit (τ2) defined by the resistor R2 and C2 and a time constant circuit (τ3) defined by the resistors R3 and R4 and the capacitor C3 are connected in series to the APD 1. The second embodiment of the present invention corresponds to a modification in which the current limiting circuit including the transistor Q1 is added to the first embodiment. If the time constant τ3 is equal to that chosen in the first embodiment shown in FIG. 7, the total resistance value of the resistors R3 and R4 connected in series is set equal to the resistance value of the resistor R3 used in the first embodiment.

Figure 11:
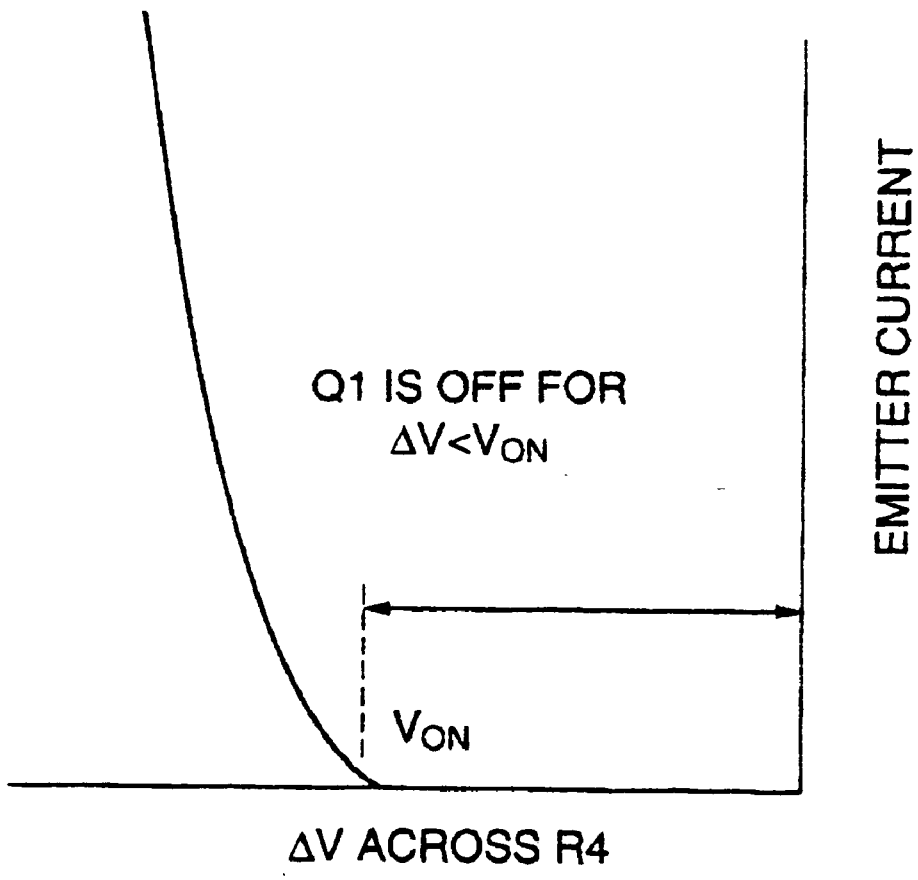
FIG. 11 is a graph of a characteristic of a transistor used in the circuit shown in FIG. 10.

FIG. 11 is a characteristic of the transistor Q1. The emitter current of the transistor Q1 depends on the base-emitter voltage thereof. More particularly, the emitter current of the transistor Q1 depends on the voltage ΔV developing across the resistor R4. For ΔV<$V_{ON}$, the transistor Q1 is OFF. If the voltage ΔV exceeds the voltage $V_{ON}$, the transistor Q1 is turned ON, and allows the current flowing in the APD 1 to pass therethrough.

For example, when the optical input level to the APD 1 is low, and a small current flows in the APD 1, the voltage ΔV developing across the resistor R4 is small, and the transistor Q1 is OFF. When the optical input level increases, the current flowing in the APD 1 increases, and the voltage ΔV also increases. When the current flowing in the APD 1 exceeds the threshold voltage, the transistor Q1 is turned ON, and the current flowing in the APD 1 passes through the transistor Q1. Thus, the voltage indicated as a voltage control point is set approximately equal to 0 V, and the bias voltage $V_{APD}$ is caused to become close to 0 V. Thus, the APD current can be limited.

Figure 12:
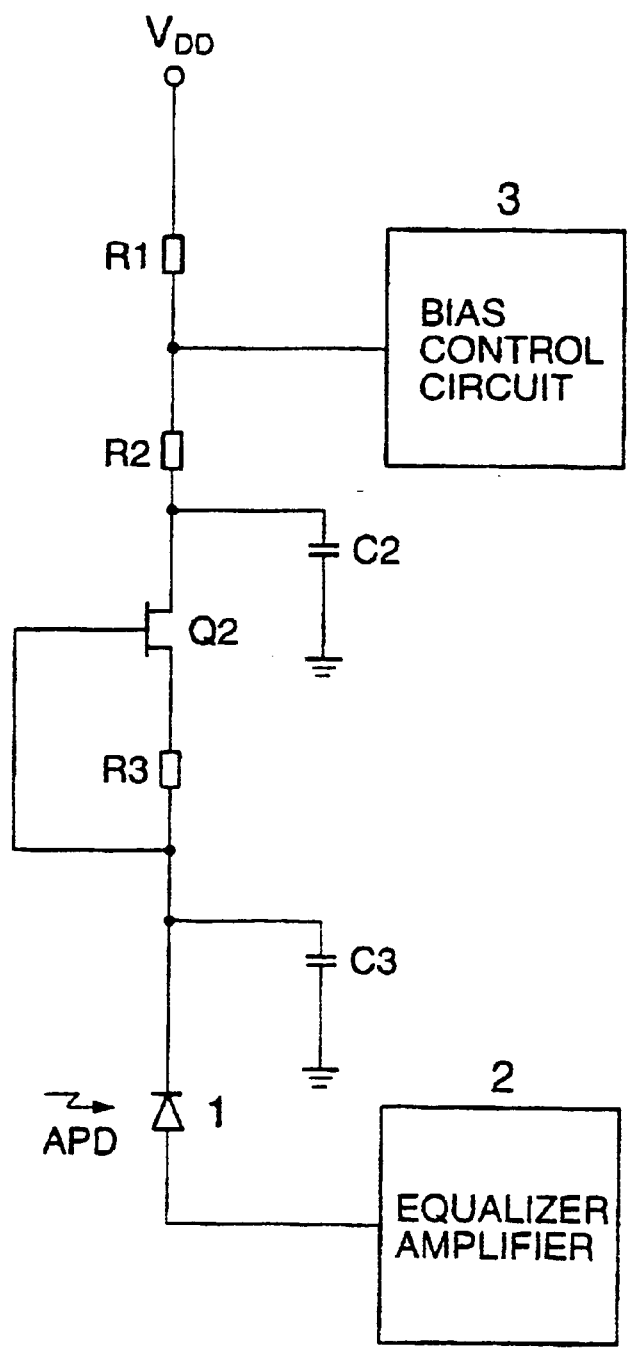
FIG. 12 is a block diagram of a third embodiment of the present invention.

FIG. 12 shows a third embodiment of the present invention, in which parts that are the same as those shown in FIG. 7 are given the same reference numbers. A depletion-type FET (Field Effect Transistor) Q2 is provided between the resistors R2 and R3 so that the drain and source thereof are connected to the resistors R2 and R3. The FET Q2 forms a current limiting circuit.

Figure 13:
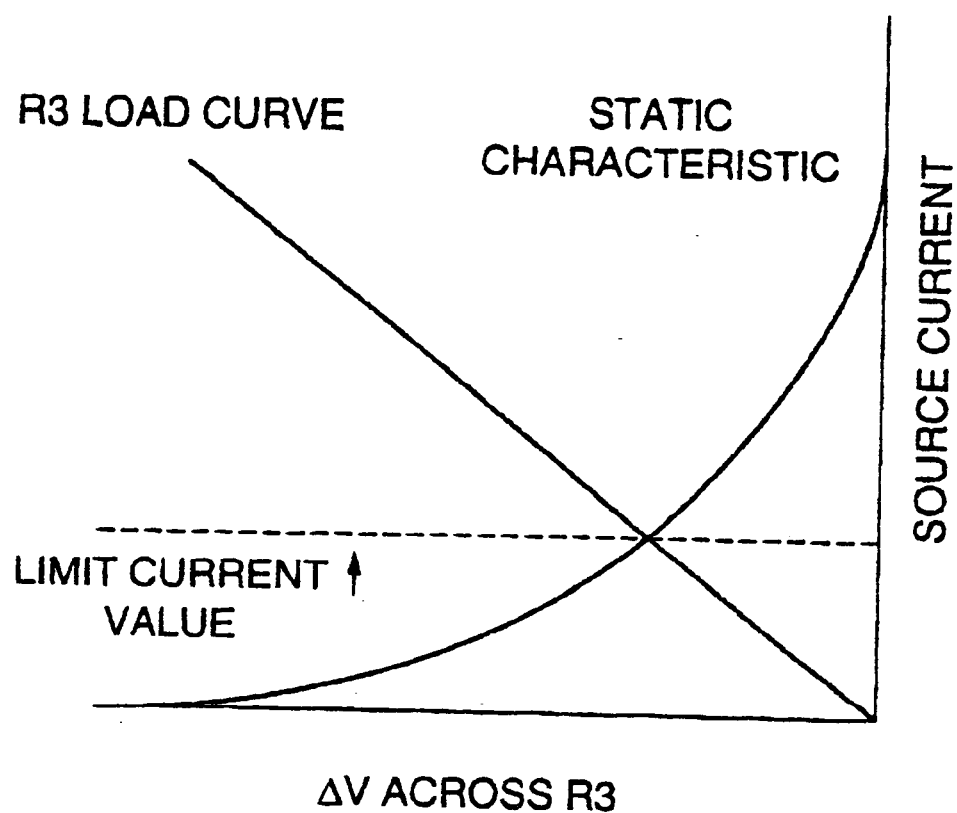
FIG. 13 is a graph of a limit current related to the third embodiment of the present invention.

The voltage ΔV developing across the resistor R3 is the source-gate voltage of the transistor Q2. As shown in FIG. 13, the APD current is limited to a limit current value. That is, when the optical input level to the APD 1 increases, a large APD current flows, and the voltage ΔV developing across the resistor R3 increases. Thus, the equivalent impedance of the transistor Q2 increases. This limits the APD current. In this case, if the breakdown voltage of the transistor Q2 is not a desired value, a plurality of transistors Q2 can be connected in series, so that each of the transistors Q2 shares the voltage. The time constant C3 changes due to the equivalent impedance of the resistor R3 and the transistor Q3.

Figure 14:
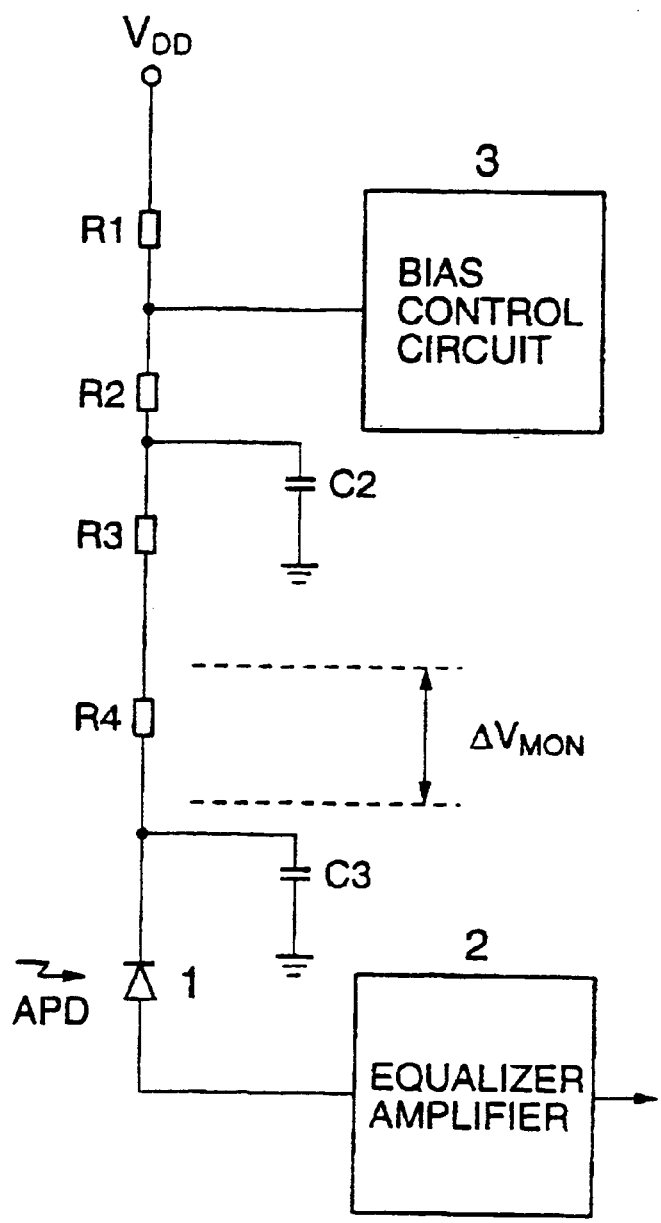
FIG. 14 is a block diagram illustrating an APD current monitor point.

FIG. 14 shows an APD current monitor point. A voltage $\Delta V_{MON}$ developing across the resistor R4, which is connected in series to the resistors R1, R2 and R3. That is, the current $I_{APD}$ flowing in the APD 1 is equal to $\Delta V_{MON}/R4$. Thus, the APD current $I_{APD}$ can be limited by controlling the voltage $\Delta V_{MON}$ not to exceed the given level.

Figure 15:
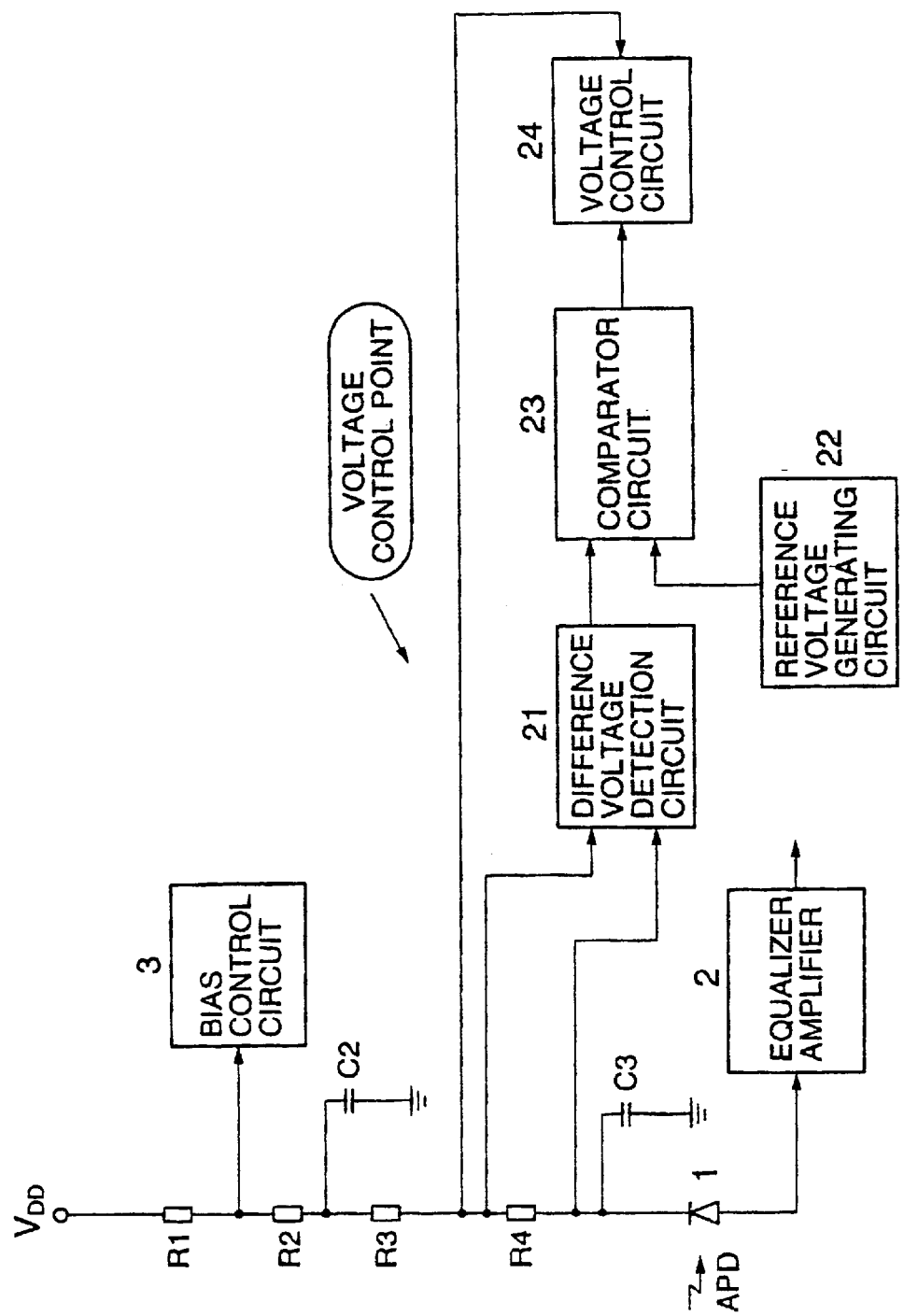
FIG. 15 is a block diagram of a fourth embodiment of the present invention.

FIG. 15 shows a fourth embodiment of the present invention, in which parts that are the same as those shown in the previously described figures are given the same reference numbers. The circuit shown in FIG. 15 includes a difference voltage detection circuit 21, a reference voltage generating circuit 22, a comparator circuit 23, and a voltage control circuit. The difference voltage detection circuit 21, the reference voltage generating circuit 22 and the comparator circuit 23 form a current limiting circuit.

The resistor R4 is used to monitor the APD current. The voltage developing across the resistor R4 is input to the difference voltage detection circuit 21. The difference voltage detection circuit 21 detects the difference between the potential of the end of the resistor R4 connected to the resistor R3 and that of the other end thereof connected to the APD 1. Eventually, the circuit 21 detects the voltage developing across the resistor R4. The comparator circuit 23 compares a reference voltage from the reference voltage generating circuit 22 and the difference voltage from the difference voltage detection circuit 21. If the difference voltage exceeds the reference voltage, the comparator circuit 23 controls the voltage control circuit 24 so that it receives an increased amount of current, which increases the drop voltages respectively developing across the resistors R2 and R3. Thus, the bias voltage $V_{APD}$ is reduced, so that the current flowing in the APD 1 can be regulated.

Figure 16:
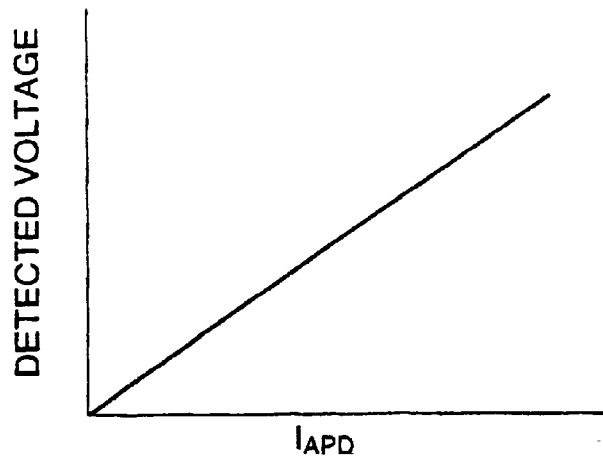
FIG. 16 is a graph of a relationship between an APD current and a detected voltage.

FIG. 16 is a graph of a detected voltage vs. the APD current $I_{APD}$. The product of the APD current $I_{APD}$ and the resistor R4 is the voltage detected by the difference voltage detection circuit 21. Hence, the slope of the characteristic curve depends on the resistance value of the resistor R4.

Figure 17:
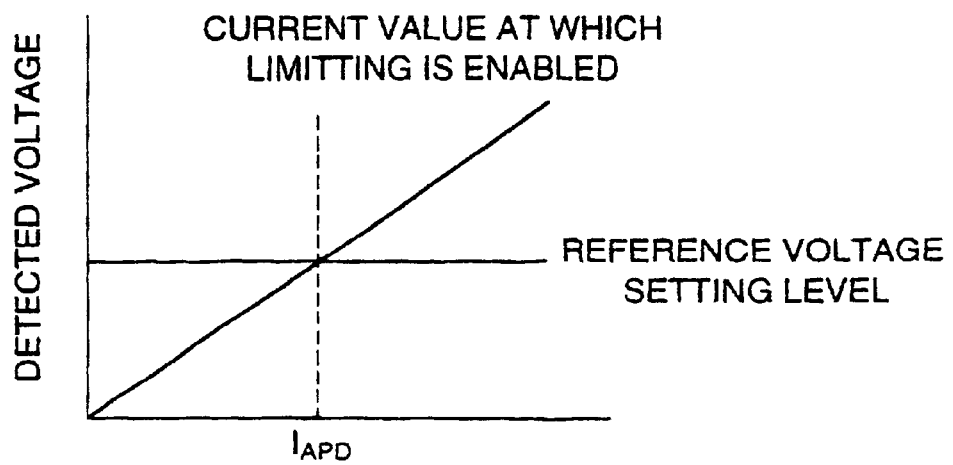
FIG. 17 is a graph illustrating how to select a reference voltage.

FIG. 17 shows the relationship between the detected voltage and the reference voltage setting level. When the detected voltage is limited to a level indicated by the APD current $I_{APD}$, the reference voltage setting level is set to the crosspoint in the characteristic curve of the detected voltage and $I_{APD}$. If the detected voltage exceeds the reference voltage setting level, the current input to the voltage control circuit 24 (FIG. 15) is increased, so that the bias voltage $V_{APD}$ is reduced and the APD current is thus limited.

Figure 18:
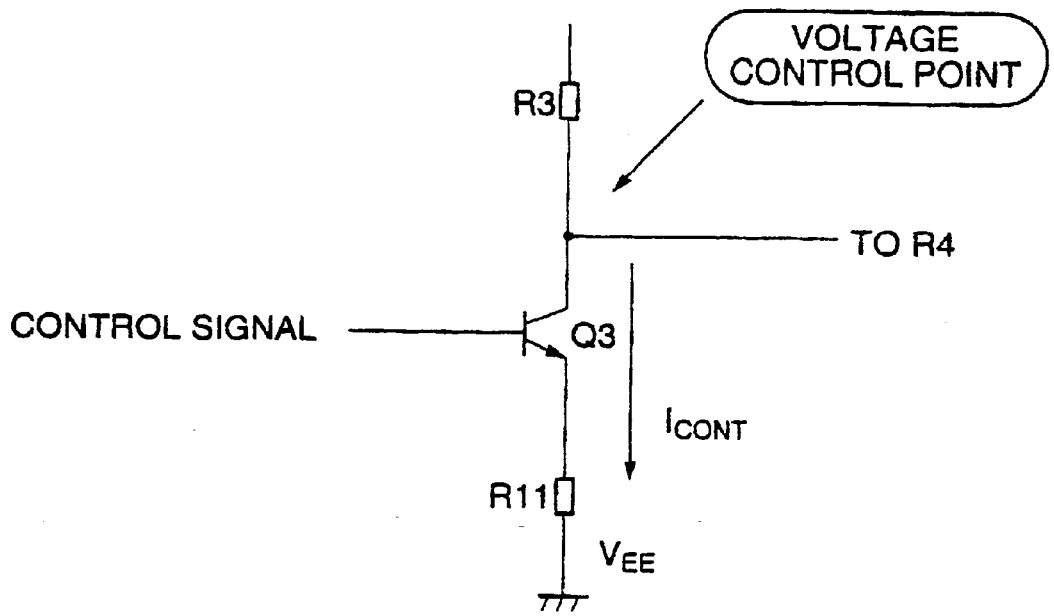
FIG. 18 is a circuit diagram of a voltage control circuit.

FIG. 18 is a circuit diagram of the voltage control circuit, which is made up of a transistor Q3 and a resistor R11. The circuit shown in FIG. 18 is related to the voltage control circuit 24, the resistors R3 and R4 and the comparator circuit 23 shown in FIG. 15. The transistor Q3 is controlled by the control signal from the comparator circuit 23. The collector of the transistor Q3 is connected to the node in which the resistors R3 and R4 are connected together, and the emitter thereof is connected to a voltage $V_{EE}$ via a resistor R11.

When the detected voltage exceeds the reference voltage, the transistor Q3 is turned ON by the control signal from the comparator circuit 23. Then, the APD current flowing in the resistors R3 and R4 is a current $I_{CONT}$ flowing in the transistor Q3 and the resistor R11. Thus, the voltage control point (the connection node of the resistors R3 and R4) is reduced, and the APD current is thus controlled.

Figure 19:
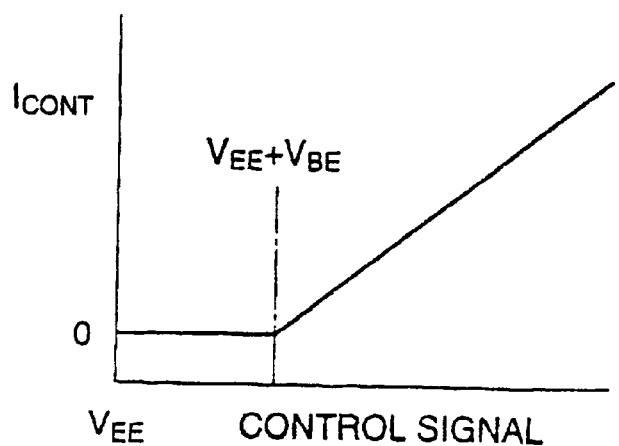
FIG. 19 is a graph of a characteristic of the voltage control circuit shown in FIG. 18.

FIG. 19 is a graph of a characteristic of the voltage control circuit. A symbol $V_{BE}$ denotes the base-emitter voltage of the transistor Q3. Let $V_{BE}$ be the ON voltage of the transistor Q3. When the control signal from the comparator circuit 23 is equal to or less than $V_{EE}+V_{BE}$, the transistor Q3 is maintained in the OFF state. Thus, the current $I_{CONT}$ is equal to 0 A. When the control signal from the comparator circuit 23 exceeds $V_{EE}+V_{BE}$, the current $I_{CONT}$ passes through the transistor Q3, so that the APD current $I_{APD}$ can be limited.

Figure 20:
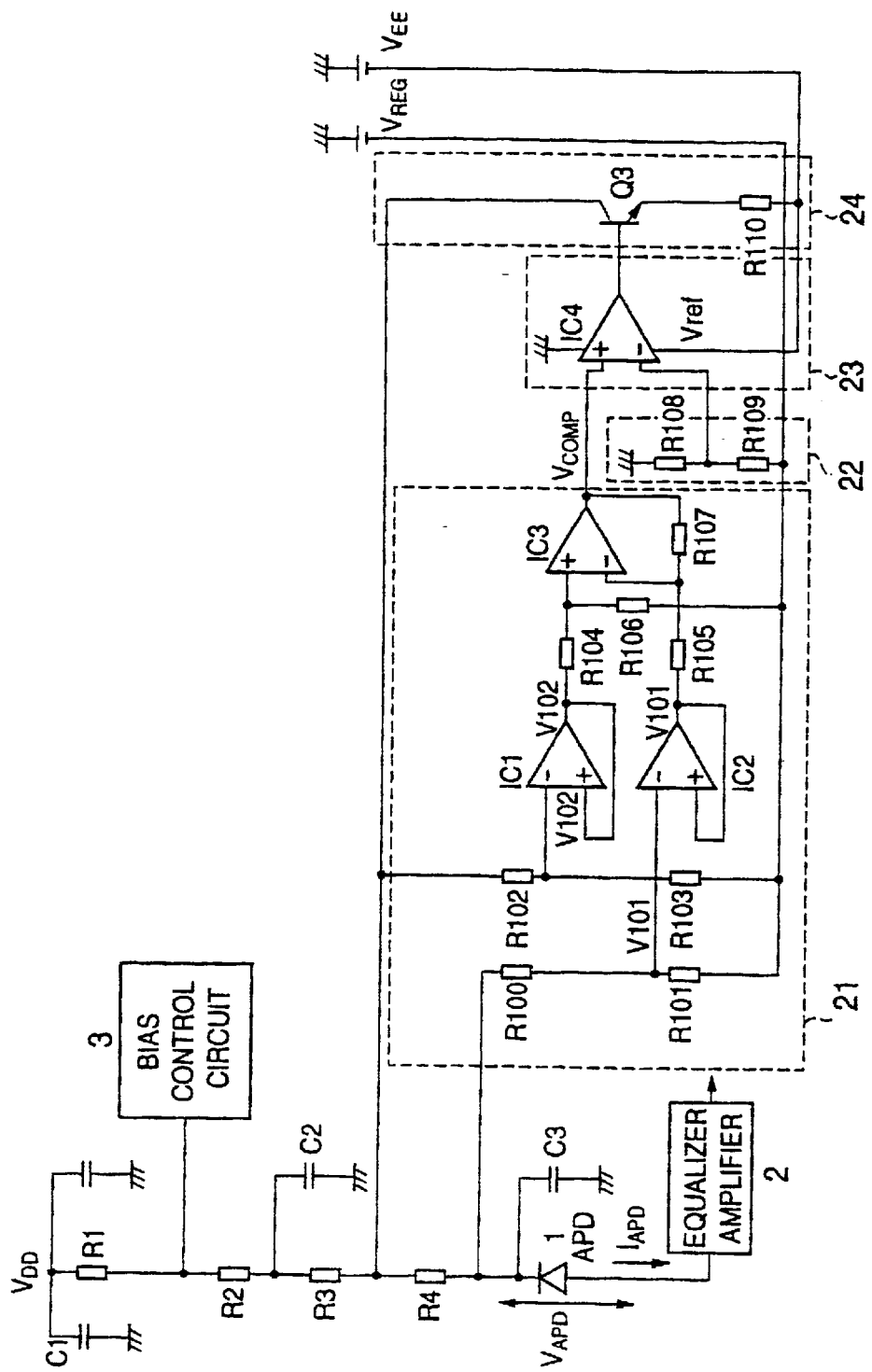
FIG. 20 is a block diagram of a fifth embodiment of the present invention.

FIG. 20 shows a fifth embodiment of the present invention, which corresponds to a detailed structure of the fourth embodiment thereof shown in FIG. 15. In FIG. 20, parts that are the same as those shown in FIG. 15 are given the same reference numbers. The circuit shown in FIG. 20 also includes capacitor C1, resistors R100–R110, and operational amplifiers IC1–IC4, which are integrally formed circuits.

The difference voltage detection circuit 21 is made up of the resistors R100–R107 and the operational amplifiers IC1–IC3. The reference voltage generating circuit 22 divides a voltage $V_{REG}$ by the resistors R108 and R109, and thus results in the reference voltage $V_{REF}$. The voltage control circuit 24 is made up of the transistor Q3 and the resistor R110. The resistor R110 corresponds to the resistor R11 shown in FIG. 18.

The voltage $V_{DD}$ is applied to the APD 1 via the resistors R1, R2, R3 and R4, and the APD current $I_{APD}$ corresponding to the optical input power flows. The resistor R2 and the capacitor C2 form the time constant circuit of the time constant τ2. The resistors R3 and R4 form the time constant circuit of the time constant τ3. The APD current $I_{APD}$ is detected by the resistor R4, and the voltage developing across the resistor R4 is divided by means of the resistors R100 and R101 and the resistors R102 and R103. Voltages V101 and V102 thus obtained are applied to the voltage-follower operational amplifiers IC1 and IC2. In this case, an error is included in the voltages V101 and V102. Thus, the resistors R100–R103 have resistance values which are sufficiently greater than the resistance value of the resistor R4 for current detection.

The output signals of the operational amplifiers IC1 and IC2 are input to the operational amplifier IC3, which obtains the difference between them. Then, the difference voltage thus obtained is applied, as the voltage $V_{CONT}$, to the comparator circuit 23. In this case, if the resistors R104–R107 have an identical resistance value, the voltage $V_{CONT}$ is normalized by the voltage $V_{REG}$. That is, $V_{CONT}=(V101-V102)+V_{REG}$.

The operational amplifier IC4 of the comparator circuit 23 compares a reference voltage Vref from the reference voltage generating circuit 22 and the difference voltage $V_{CONT}$ with each other, and turns ON the transistor Q3 of the voltage control circuit 24 when the APD current $I_{APD}$ increases so that the difference voltage Vref exceeds the difference voltage $V_{CONT}$ and increases. Thus, a part of the current $I_{APD}$ flowing to the APD 1 via the resistor R3 flows in the transistor Q3. Thus, it is possible to limit the APD current $I_{APD}$ so that it does not exceed the predetermined level.

Figure 21:
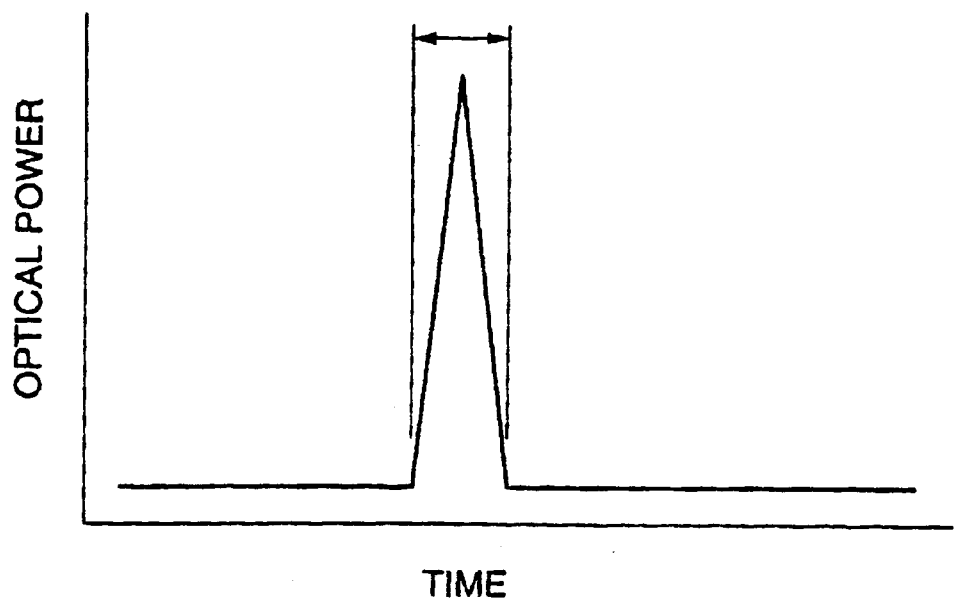
FIG. 21 is a diagram illustrating an optical surge.

FIG. 21 is a graph of an optical surge. An optical surge may occur resulting from the performance of the optical amplifier. For example, let us consider an arrangement in which an optical amplifier having an erbium-doped optical fiber includes a control circuit which maintains the optical output level at a constant level. In the above arrangement, even when a feedback control is carried out in a state wherein a light signal is input in a state in which a pump light remains, the light signal is excessively amplified and an optical surge may occur. If the optical surge is applied to the optical receiver, the APD current is abruptly changed, and the control of the bias voltage may not follow the abrupt change of the APD current. Thus, the bias voltage may exceed the breakdown voltage or the APD current may exceed the maximum rate current.

Figure 22:
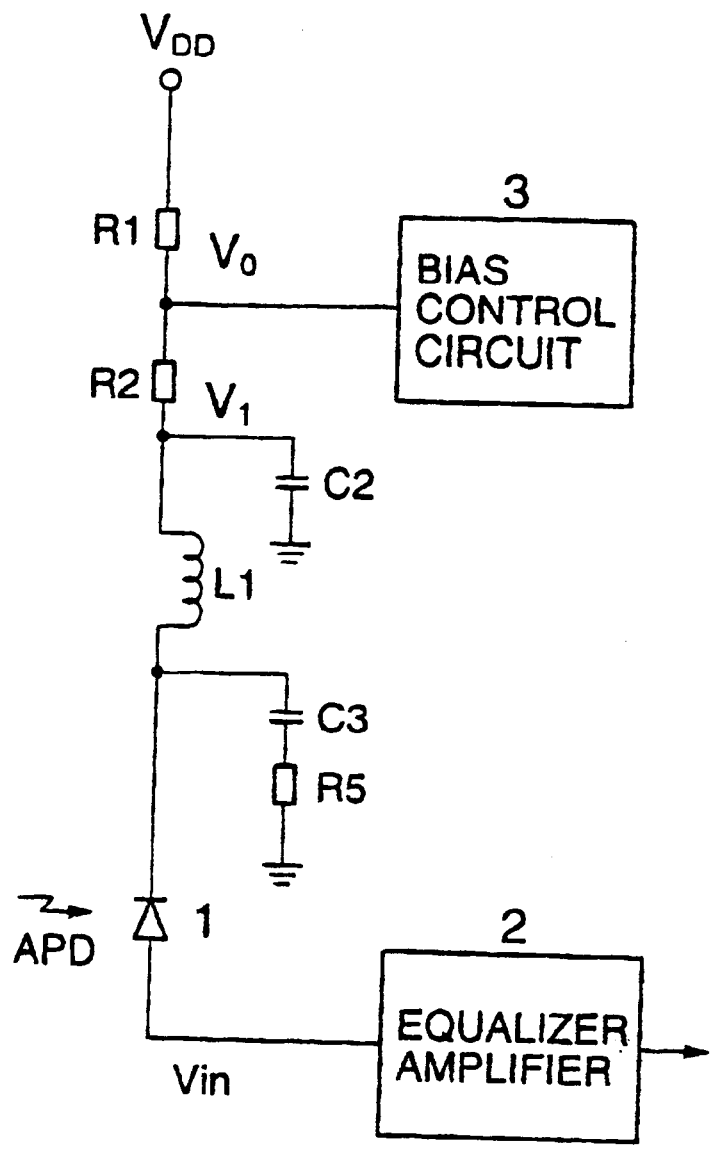
FIG. 22 is a block diagram of a sixth embodiment of the present invention.

FIG. 22 shows a sixth embodiment of the present invention, in which parts that are the same as those shown in FIG. 7 are given the same reference numbers. The circuit shown in FIG. 22 also includes an inductance L1 and a resistor R5. In the circuit shown in FIG. 22, the following equations stand:

$Z_L=(Vo-Vin)/I_{LIM}$ $Z_L=2\pi L1/\tau$ where $Z_L$ is the impedance of the inductor L1, τ is the time constant of the rise of the optical surge, and $I_{LIM}$ is the limit current. From the above equations, the inductance L1 is obtained as follows:

$L1=\tau L(Vo-Vin)/2\pi ILIM$.

The resistor R5 is used to prevent a resonance due to the capacitor C3 and the inductance L1, and is set approximately equal to a few ohms.

When an optical surge is applied to the APD 1, the APD current $I_{APD}$ based on the optical surge flows. An abrupt rise of the APD current $I_{APD}$ is suppressed by the inductance L1. It is thus possible to avoid degradation of the performance of the APD 1 due to excessive current.

Figure 23:
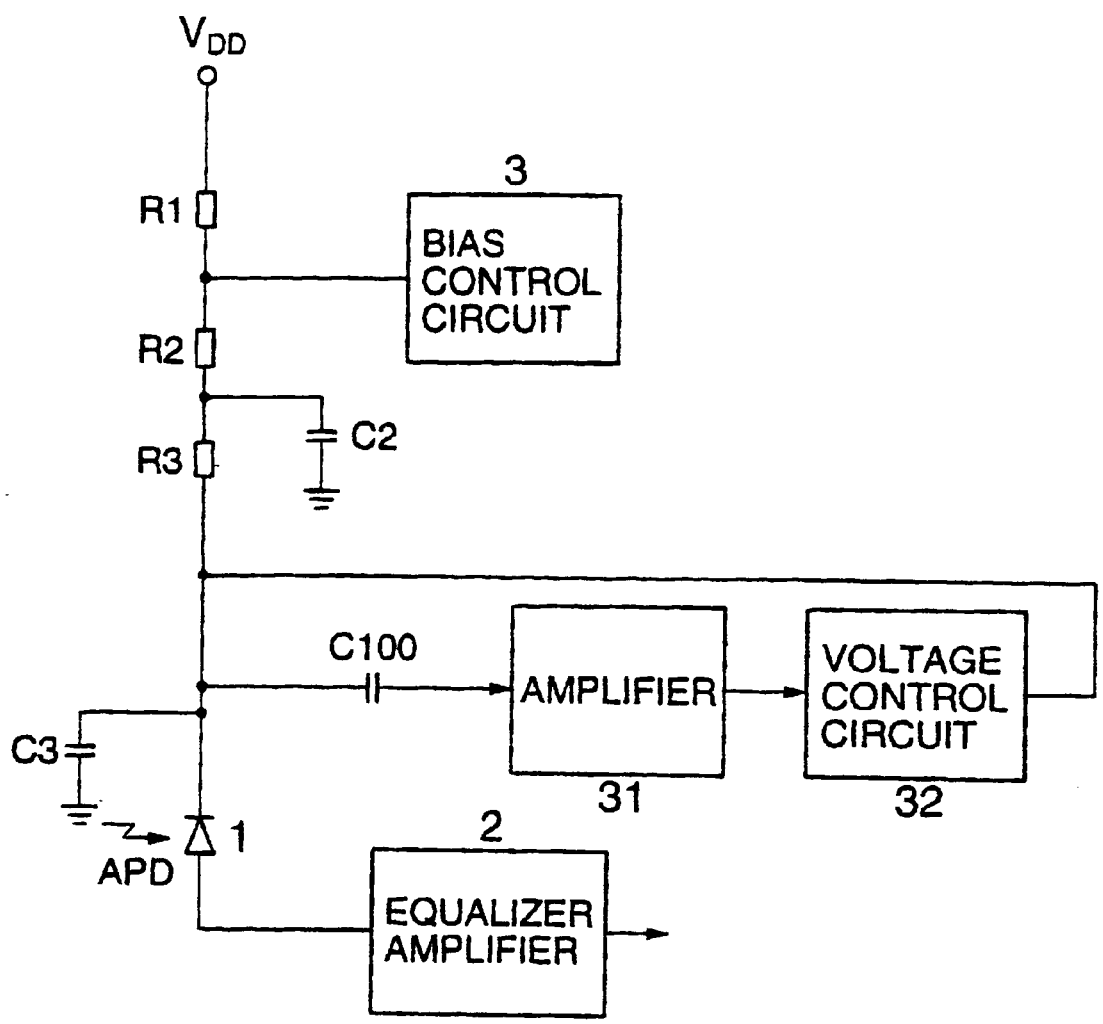
FIG. 23 is a block diagram of a seventh embodiment of the present invention.

FIG. 23 shows a seventh embodiment of the present invention, in which parts that are the same as those shown in the previously described figures are given the same reference numbers. The circuit shown in FIG. 23 also includes a coupling capacitor C100, an amplifier 31, and a voltage control circuit 32. An abrupt change of the APD current $I_{APD}$ due to the optical surge is applied to the amplifier 31 via the capacitor C100. When an increase in the APD current $I_{APD}$ is detected, the voltage control circuit 32 pulls a part of the current so that the APD bias voltage can be reduced and the APD current $I_{APD}$ does not exceed the maximum rated current. The voltage control circuit 32 pulls part of the current and reduces the APD bias voltage only when the APD current $I_{APD}$ increases due to the optical surge. The voltage control circuit 32 does not operate when the photo input changes from the input broken level.

Figure 24:
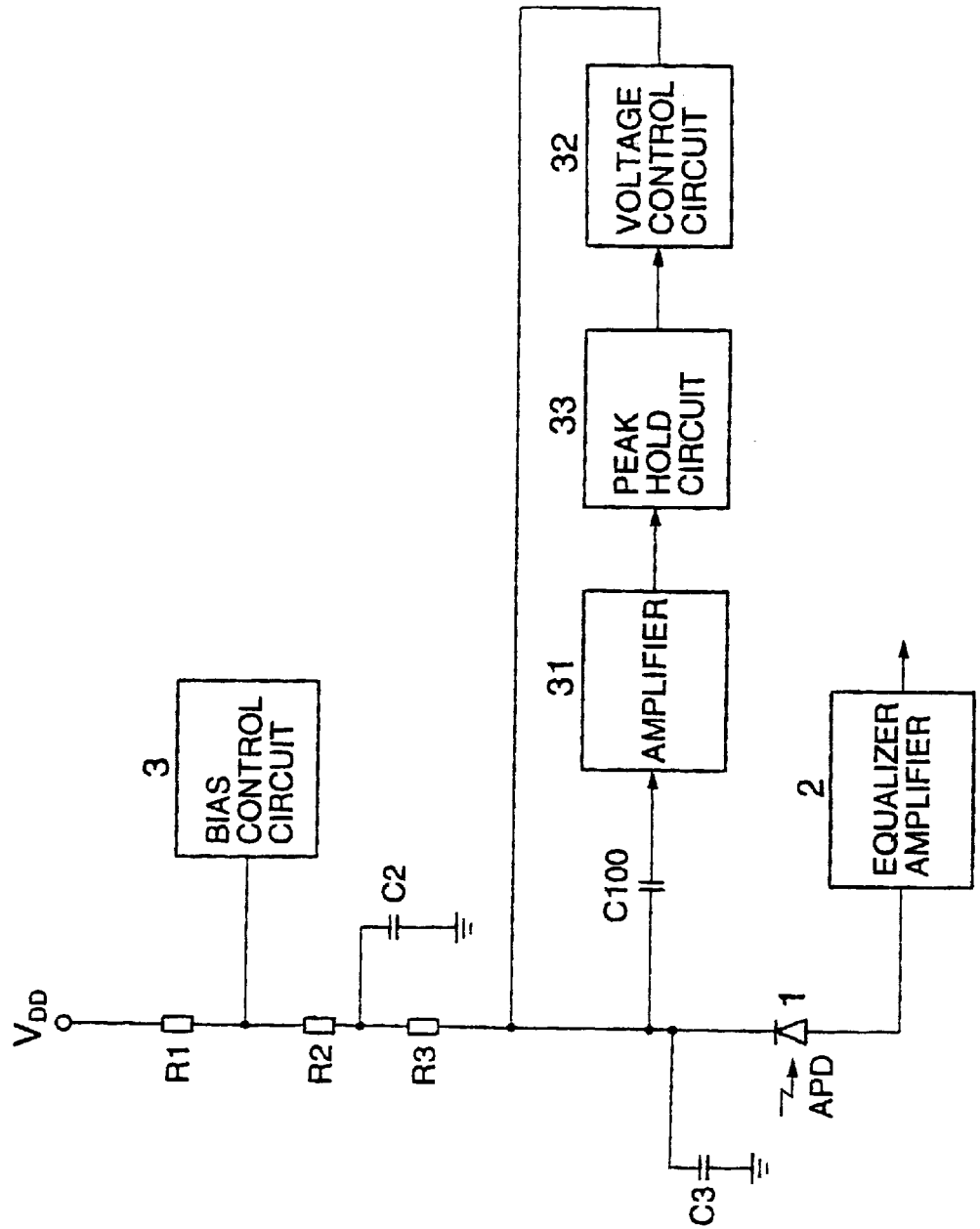
FIG. 24 is a block diagram of an eighth embodiment of the present invention.

FIG. 24 shows an eighth embodiment of the present invention, in which parts that are the same as those shown in FIG. 23 are given the same reference numbers. The circuit shown in FIG. 24 also includes a peak hold circuit 33. When the optical surge is applied to the APD 1, a variation component is amplified by the amplifier 31 via the capacitor C100 and is held by the peak hold circuit 33, which then controls the voltage control circuit 32. With the above construction, it is possible to continuously reduce the APD bias voltage for a given time and thus protect the APD 1 from optical surges having different time constants.

FIGS. 25A through 25D show an operation of the circuit including the peak hold circuit 33. More particularly, FIG. 25A shows an optical surge input, FIG. 25B shows an input to the amplifier, FIG. 25C shows an input to the voltage control circuit in which the amplifier 31 is an inverted amplifier, and FIG. 25D shows the APD bias voltage. When an optical surge input is applied as shown in FIG. 25A, the corresponding APD current flows. The corresponding variation is input to the amplifier 31 via the capacitor C100, as shown in FIG. 25B, and is held by the peak hold circuit 33.

If the peak hold circuit 33 is not provided, as indicated by a broken line shown in FIG. 25C, an input signal to the voltage control circuit 32 has a waveform similar to the waveform of the optical surge. In contrast, the peak hold circuit 33 performs the peak hold operation for a given period, as indicated by a solid line in FIG. 25C. Thus, as indicated by a solid line in FIG. 25D, voltage control circuit 32 reduces the APD bias voltage for the given period, so that the APD current can be suppressed. Thus, even if various optical surges having different time constants are input, the APD current can be limited so that it does not exceed the maximum rated current. In the case where the peak hold circuit 33 is not provided, as indicated by a broken line in FIG. 25D, the APD bias voltage is reduced only for a short period equaling the optical surge input period. Thus, the APD current can be suppressed.

Figure 26:
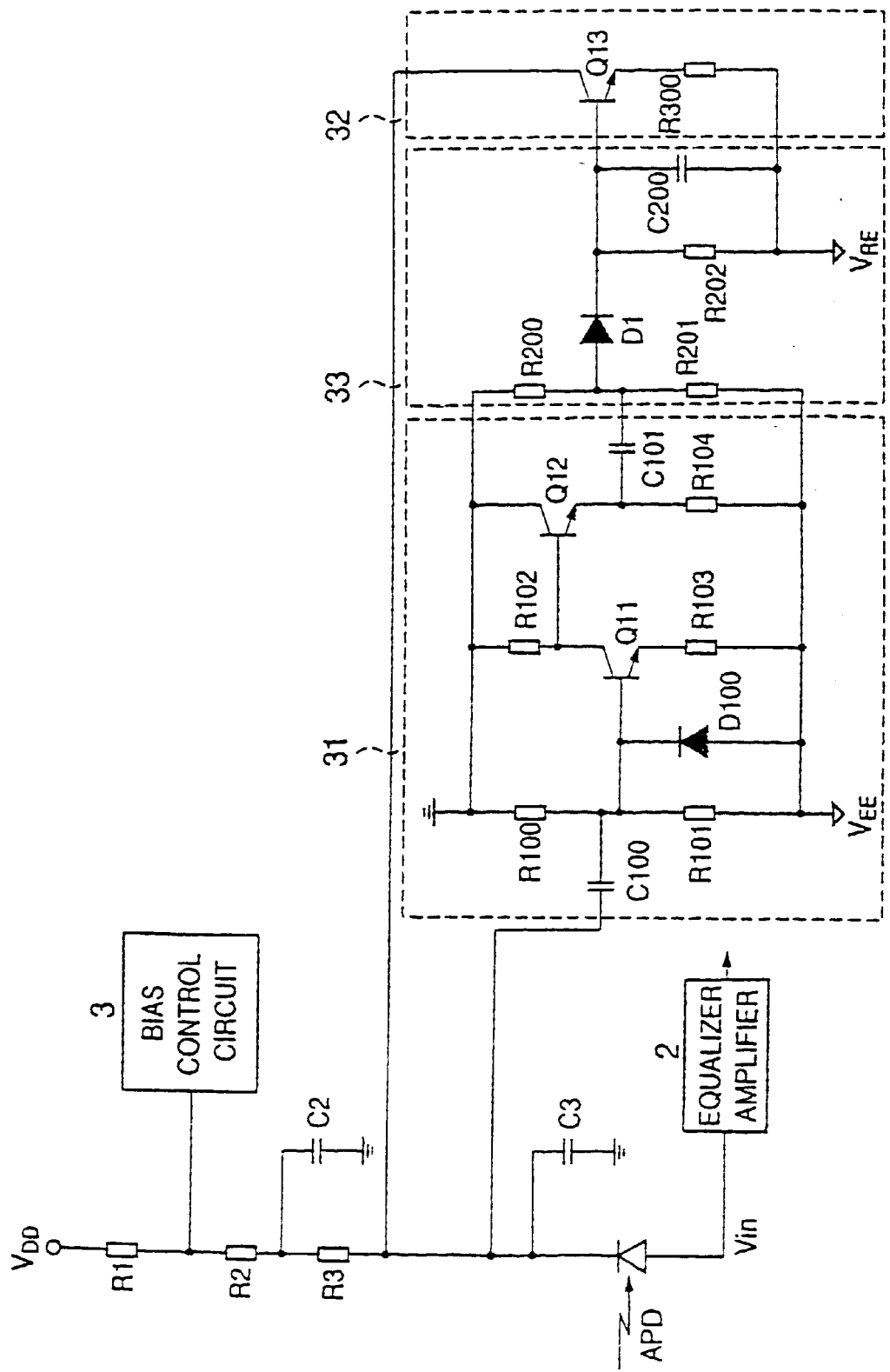
FIG. 26 is a circuit diagram of the eighth embodiment of the present invention.

FIG. 26 is a circuit diagram of the eighth embodiment of the present invention, in which parts that are the same as those shown in FIG. 24 are given the same reference numbers. The circuit shown in FIG. 26 also includes capacitors C100, C101 and C200, resistors R100–R104, R200–R202 and R300, diodes D1 and D100, and transistors Q11–Q13. Voltages $V_{DD}$, $V_{EE}$ and $V_{REG}$ correspond to those shown in FIG. 19. The voltage $V_{REG}$ is set to equal to the voltage Vin applied to the equalizer amplifier 2 in order to prevent the APD 1 from being biased in the forward direction.

The amplifier 31 forms an inverted amplifier including the coupling capacitor C100 and the transistors Q11 and Q12. The diode D100 connected to the base of the transistor Q11 is used for protection. The peak hold circuit 33 includes the diode D1, the resistor R202 and the capacitor C200. The time constant in the peak hold circuit 33, which performs the peak hold operation, is defined by the resistor R202 and the capacitor C200. The voltage control circuit 32 includes the transistor Q13, the base of which receives the output signal of the peak hold circuit 33. The transistor Q13 allows the current flowing in the APD 1 to pass therethrough. Thus, the bias voltage $V_{APD}$ of the APD 1 is reduced and the APD current caused by the optical surge is limited.

The present invention is not limited to the specifically disclosed embodiments, and variations and modifications may be made without departing from the scope of the present invention. A variety of APD bias circuits can be constructed by various combinations of the aforementioned embodiments. In the aforementioned description, the time-constant circuits which have the time constants τ2 and τ3 are connected in series to the APD 1. However, more than two time-constant circuits can be used. A Zener diode can be connected in parallel with the APD. In this case, it is required that the Zener diode does not affect the high-speed optical signal. A diode may be connected in parallel with the APD in order to protect the APD from a situation in which the APD is forwardly biased.

What is claimed is:

1. An APD bias circuit adapted to a circuit having an APD receiving an optical signal, and an equalizer amplifier receiving an output signal of the APD, said APD bias circuit comprising:

first, second and third resistors connected in series to the APD to which a bias voltage is applied therethrough;

a bias control circuit connected to a first node between the first and second resistors, the bias control circuit receiving a current from the first node so that a voltage of the first node can be maintained at a constant level;

a first capacitor connected between a ground and a second node between the second and third resistors; and a second capacitor connected between the ground and a third node between the third resistor and the APD, a first time constant defined by the second resistor and the first capacitor being greater than a second time constant defined by the third resistor and the second capacitor.

2. The APD bias circuit as claimed in claim 1, wherein the first time constant is greater than a third time constant obtained when the optical signal is broken.

3. The APD bias circuit as claimed in claim 1, wherein the second time constant is smaller than a fourth time constant obtained when an optical surge rises.

4. The APD bias circuit as claimed in claim 2, wherein the second time constant is smaller than a fourth time constant obtained when an optical surge rises.

5. The APD bias circuit as claimed in claim 1, further comprising:

a fourth resistor connected in series to the third resistor; and a transistor having a base connected to a fourth node between the fourth resistor and a cathode of the APD, an emitter connected to a fifth node between the third and fourth resistors, and a collector connected to the ground, the transistor functioning as a current limiting circuit.

6. The APD bias circuit as claimed in claim 1, further comprising a transistor having a drain connected to the second resistor, a source connected to one end of the third resistor, and a gate connected to other end of the third transistor so that the third resistor is connected between the gate and source of the transistor, the transistor being of a depletion type and functioning as a current limiting circuit.

7. The APD bias circuit as claimed in claim 6, wherein the first time constant is greater than a third time constant obtained when the optical signal is broken.

8. The APD bias circuit as claimed in claim 6, wherein the second time constant is smaller than a fourth time constant obtained when an optical surge rises.

9. The APD bias circuit as claimed in claim 1, further comprising:

a fourth resistor connected in series to the third resistor;

a difference voltage detection circuit detecting a voltage developing across the fourth resistor;

a comparator circuit comparing an output voltage of the difference voltage detection circuit with a reference voltage; and a voltage control circuit pulling a part of a current flowing in the APD in response to an output of the comparator circuit produced when the voltage detected by the difference voltage detection circuit exceeds the reference voltage, the difference voltage detection circuit, the comparator circuit, and the voltage control circuit forming a current limiting circuit.

10. The APD control circuit as claimed in claim 1, further comprising an inductance connected in series to the APD circuit, the inductance suppressing an abrupt change of the current flowing in the APD.

11. The APD control circuit as claimed in claim 1, further comprising a current limiting circuit connected to the APD, the current limiting circuit comprising:

an amplifier detecting and amplifying an abrupt change of the bias voltage applied to the APD;

a voltage control circuit pulling a part of a current flowing in the APD at the time of an abrupt rise of the bias voltage in response to an output signal of the amplifier.

12. The APD bias circuit as claimed in claim 11, further comprising a peak hold circuit provided between the amplifier and the voltage control circuit.

13. The APD control circuit as claimed in claim 2, further comprising an inductance connected in series to the APD circuit, the inductance suppressing an abrupt change of the current flowing in the APD.

14. The APD control circuit as claimed in claim 3, further comprising an inductance connected in series to the APD circuit, the inductance suppressing an abrupt change of the current flowing in the APD.

15. The APD control circuit as claimed in claim 4, further comprising an inductance connected in series to the APD circuit, the inductance suppressing an abrupt change of the current flowing in the APD.

16. The APD control circuit as claimed in claim 5, further comprising an inductance connected in series to the APD circuit, the inductance suppressing an abrupt change of the current flowing in the APD.

17. The APD control circuit as claimed in claim 6, further comprising an inductance connected in series to the APD circuit, the inductance suppressing an abrupt change of the current flowing in the APD.

18. The APD control circuit as claimed in claim 7, further comprising an inductance connected in series to the APD circuit, the inductance suppressing an abrupt change of the current flowing in the APD.

19. The APD control circuit as claimed in claim 8, further comprising an inductance connected in series to the APD circuit, the inductance suppressing an abrupt change of the current flowing in the APD.

20. The APD control circuit as claimed in claim 9, further comprising an inductance connected in series to the APD circuit, the inductance suppressing an abrupt change of the current flowing in the APD.

21. The APD control circuit as claimed in claim 2, further comprising a current limiting circuit connected to the APD, the current limiting circuit comprising:

an amplifier detecting and amplifying an abrupt change of the bias voltage applied to the APD;

a voltage control circuit pulling a part of a current flowing in the APD at the time of an abrupt rise of the bias voltage in response to an output signal of the amplifier.

22. The APD control circuit as claimed in claim 3, further comprising a current limiting circuit connected to the APD, the current limiting circuit comprising:

an amplifier detecting and amplifying an abrupt change of the bias voltage applied to the APD;

a voltage control circuit pulling a part of a current flowing in the APD at the time of an abrupt rise of the bias voltage in response to an output signal of the amplifier.

23. The APD control circuit as claimed in claim 4, further comprising a current limiting circuit connected to the APD, the current limiting circuit comprising:

an amplifier detecting and amplifying an abrupt change of the bias voltage applied to the APD;

a voltage control circuit pulling a part of a current flowing in the APD at the time of an abrupt rise of the bias voltage in response to an output signal of the amplifier.

24. An optical receiver comprising:

an APD receiving an optical signal;

an equalizer amplifier receiving an output signal of the APD:

first, second and third resistors connected in series to the APD to which a bias voltage is applied therethrough;

a bias control circuit connected to a first node between the first and second resistors, the bias control circuit receiving a current from the first node so that a voltage of the first node can be maintained at a constant level;

a first capacitor connected between a ground and a second node between the second and third resistors; and a second capacitor connected between the ground and a third node between the third resistor and the APD, a first time constant defined by the second resistor and the first capacitor being greater than a second time constant defined by the third resistor and the second capacitor.

* * * * *